United States Patent
Khoshnevisan et al.

(10) Patent No.: US 12,501,459 B2
(45) Date of Patent: Dec. 16, 2025

(54) TECHNIQUES FOR SIGNALING USER EQUIPMENT CAPABILITY FOR PDCCH REPETITION

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 470 days.

(21) Appl. No.: 17/573,252

(22) Filed: Jan. 11, 2022

(65) Prior Publication Data
US 2022/0225319 A1    Jul. 14, 2022

Related U.S. Application Data

(60) Provisional application No. 63/136,297, filed on Jan. 12, 2021.

(51) Int. Cl.
*H04W 72/232*    (2023.01)
*H04L 5/00*    (2006.01)
(Continued)

(52) U.S. Cl.
CPC .......... *H04W 72/51* (2023.01); *H04W 24/08* (2013.01); *H04W 72/0446* (2013.01); *H04W 72/0453* (2013.01); *H04W 72/23* (2023.01)

(58) Field of Classification Search
None
See application file for complete search history.

(56) References Cited

U.S. PATENT DOCUMENTS 11,044,621 B2   6/2021  Hosseini et al.
2019/0274032 A1*  9/2019  Chatterjee ................ H04L 5/00
(Continued)

FOREIGN PATENT DOCUMENTS

CN    111512583 A     8/2020
WO    WO-2020201995 A1   10/2020
WO    WO-2020209953 A1   10/2020

OTHER PUBLICATIONS

CATT: "Discussion on Enhancements on Multi-TRP/Panel for PDCCH, PUCCH and PUSCH", 3GPP Draft, 3GPP TSG RAN WG1 Meeting #103-e, R1-2007825, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946506, 15 Pages, Retrieved from the Internet: URL: https://ftp.3gpp.org/tsg_ran/WG1_RL1/TSGR1_103-e/Docs/R1-2007825.zip R1-2007825.docx [Retrieved on Oct. 24, 2020] pp. 1-3, the Agreements, section "2 .1. Multiplexing schemes", Figure 1 and Figure 2, section "2.2. Possible combinations for non-SFN chemes", section "2.3.Schemes to facilitate blind detection" , Proposals 3, 4, 5, 6, paqe 4-paqe 6, fiqure 1.
(Continued)

*Primary Examiner* — Duc T Duong
(74) *Attorney, Agent, or Firm* — Holland & Hart LLP

(57) ABSTRACT

Methods, systems, and devices for wireless communications are described. A user equipment (UE) may transmit, to a base station, a UE capability to support receipt of multiple related downlink control channel transmissions, where the multiple related downlink control channel transmissions that are supported are one or more of single-frequency network (SFN) downlink control channel transmissions, intra-slot downlink control channel repetitions, or inter-slot downlink control channel repetitions, and are associated with one or more control resource sets. The UE may receive, from the
(Continued)

base station based on transmission of the UE capability, a configuration for receiving the multiple related downlink control channel transmissions. The UE may then monitor a downlink control channel in accordance with the configuration.

29 Claims, 14 Drawing Sheets

(51) Int. Cl.
*H04W 24/08* (2009.01)
*H04W 72/0446* (2023.01)
*H04W 72/0453* (2023.01)
*H04W 72/23* (2023.01)
*H04W 72/51* (2023.01)

(56) References Cited

U.S. PATENT DOCUMENTS

| | | | | |
|---|---|---|---|---|
| 2020/0068387 | A1* | 2/2020 | Dou | H04J 11/004 |
| 2021/0143943 | A1* | 5/2021 | Zhou | H04W 72/0453 |
| 2022/0007371 | A1* | 1/2022 | Kyung | H04W 72/0446 |
| 2022/0039140 | A1* | 2/2022 | Yi | H04L 1/08 |
| 2022/0104237 | A1* | 3/2022 | Muruganathan | H04W 72/51 |
| 2022/0116981 | A1* | 4/2022 | Saber | H04L 1/08 |
| 2022/0232613 | A1* | 7/2022 | Gao | H04L 1/1887 |
| 2022/0248436 | A1* | 8/2022 | Zhang | H04L 1/1854 |
| 2022/0329399 | A1* | 10/2022 | Kittichokechai | H04W 8/24 |
| 2023/0050473 | A1* | 2/2023 | Takahashi | H04W 72/23 |
| 2023/0124582 | A1* | 4/2023 | Frenne | H04L 5/0012 370/329 |
| 2023/0147122 | A1* | 5/2023 | Canonne-Velasquez | H04L 1/08 370/329 |
| 2023/0199787 | A1* | 6/2023 | Cirik | H04L 5/0053 |
| 2023/0284235 | A1* | 9/2023 | Gao | H04L 5/0051 370/329 |
| 2023/0309111 | A1* | 9/2023 | Matsumura | H04W 72/232 |

OTHER PUBLICATIONS

Huawei, et al., "Summary of AI: 7.2.8.2 Enhancements on Multi-TRP/Panel Transmission of Offline Discussion", 3GPP Draft, R1-1903541, 3GPP TSG RAN WG1 Meeting #96, Feature Lead Summary For Enhancements on Multi-TRP_V2, 3rd Generation Partnership Project (3GPP), Mobile Competence Centre, 650, Route Des Lucioles, F-06921, Sophia-Antipolis Ce, vol. RAN WG1, No. Athens, Greece, Feb. 25, 2019-Mar. 1, 2019, Feb. 27, 2019 (Feb. 27, 2019), XP051601181, 59 Pages, Retrieved from the Internet: URL:http://www.3gpp.org/ftp/tsg%5Fran/WG1%5FRL1/TSGR1%5F96/Docs/R1%2D1903541%2Ezip [retrieved on Feb. 27, 2019] p. 10-p. 56.
International Search Report and Written Opinion—PCT/US2022/012171—ISA/EPO—May 13, 2022 (2101494WO).
Lenovo, et al., "Enhancements on Multi-TRP for PDCCH, PUCCH and PUSCH", 3GPP Draft, 3GPP TSG RAN WG1 #103-e, R1-2008911, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (OCt. 24, 2020), XP051946723, 15 Pages, Retrieved from the Internet: URL: https://ftp.3gpp.org/tsg_ran/WG1_RL1/TSGR1_103-e/Docs/R1-2008911.zip R1-2008911 PDCCH PUCCH and PUSCH Enhancements with Multi-TRP_Final.doc [Retrieved on Oct. 24, 2020] pp. 2-3, the Agreements: "For mTRP PDCCH reliability enhancements, . . . ", . . . , "For non-SFN based mTRP PDCCH reliability enhancements, . . . ", etc. section "2.1 Transmission schemes for enhanced PDCCH", section "2.2 Configuration for CORESET and search space set", section "2.3 Coding/rate matching chain and UE decoding behavior", section "2.4 Linkage between PDCCH candidates"—the entire section, paqe 8-paqe 9.
Samsung: "Enhancements on Multi-TRP for PDCCH, PUCCH and PUSCH", 3GPP Draft, R1-2008149, 3GPP TSG RAN WG1 #103-e, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 26, 2020-Nov. 13, 2020, Oct. 23, 2020 (Oct. 23, 2020), XP051945332, 11 Pages, Retrieved from the Internet: URL:https://ftp.3gpp.org/tsg_ran/WG1_RL1/TSGR1_103-e/Docs/R1-2008149.zip R1-2008149_MTRP PDCCH, PUSCH, PUCCH.docx [retrieved on Oct. 23, 2020] p. 4.
Vivo: "Further Discussion on Enhancement of MTRP Operation", 3GPP Draft, R1-2007645, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1. No. e-Meeting, Oct. 26, 2020-Nov. 13, 2020, Oct. 24, 2020 (OCt. 24, 2020), XP051946454, 15 Pages, Retrieved from the Internet: URL:https://ftp.3gpp.org/tsg_ran/WG1_RL1/TSGR1_103-e/Docs/R1-2007645.zip, R1-2007645.docx [retrieved on Oct. 24, 2020] Section 3.3, Sections 3 and 4, Subsection "TDM", page second, paqe 2-paqe 13.
Mediatek Inc: "Enhancements on Multi-TRP for PDCCH, PUSCH and PUCCH", 3GPP TSG RAN WG1 #103-e, R1-2008958, e-Meeting, Oct. 26-Nov. 13, 2020, Nov. 13, 2020, 14 Pages.
Mediatek Inc: "Enhancements on Multi-TRP for PDCCH, PUSCH and PUCCH", R1-2005621, 3GPP TSG RAN WG1 #102-e, 3rd Generation Partnership Project, Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020, XP051917597, 5 Pages.
Samsung: "Enhancements on Multi-TRP for PDCCH, PUCCH and PUSCH", 3GPP TSG RAN WG1 #103-e, R1-2008149, e-Meeting, Oct. 26, 2020-Nov. 13, 2020, Nov. 2, 2020, 11 Pages, Section 1-2.

* cited by examiner

TECHNIQUES FOR SIGNALING USER EQUIPMENT CAPABILITY FOR PDCCH REPETITION

CROSS REFERENCE

The present application for patent claims the benefit of U.S. Provisional Patent Application No. 63/136,297 by KHOSHNEVISAN et al., entitled "TECHNIQUES FOR SIGNALING USER EQUIPMENT CAPABILITY FOR PDCCH REPETITION," filed Jan. 12, 2021, assigned to the assignee hereof, and expressly incorporated by reference herein.

TECHNICAL FIELD

The following relates to wireless communications, including techniques for signaling user equipment capability for physical downlink control channel (PDCCH) repetition.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support the repetition of various signals, such as control information or data. For example, multiple repetitions of a physical downlink control channel (PDCCH) transmission may be transmitted within a single slot (e.g., intra-slot PDCCH repetition), across multiple slots (e.g., inter-slot PDCCH repetition), or both. By way of another example, in the context of single frequency networks (SFNs), a base station may transmit multiple linked (e.g., related) PDCCH transmissions, where each PDCCH transmission is associated with two transmission configuration indicators (TCIs).

SUMMARY

The described techniques relate to improved methods, systems, devices, and apparatuses that support techniques for signaling user equipment capability for physical downlink control channel (PDCCH) repetition. Generally, the described techniques provide for signaling and other techniques which enable a UE to inform the network that the UE is able to support receipt of single-frequency network (SFN) PDCCH transmissions, inter-slot PDCCH repetitions, or intra-slot PDCCH repetitions, or any combination thereof. In some aspects, a UE may indicate a capability to receive/decode multiple related downlink control channel transmissions using a UE capability report which indicates that the UE is able to receive multiple PDCCH repetitions, including SFN PDCCH transmissions, inter-slot PDCCH repetitions, and/or intra-slot PDCCH repetitions. Based on the indicated UE capability, the UE may receive a configuration for receiving multiple related PDCCH transmissions, and may monitor a PDCCH in accordance with the configuration.

A method for wireless communication at a UE is described. The method may include transmitting, to a base station, a UE capability to support receipt of multiple related downlink control channel transmissions, where the multiple related downlink control channel transmissions that are supported include one or more of SFN downlink control channel transmissions, intra-slot downlink control channel repetitions, or inter-slot downlink control channel repetitions, and are associated with one or more control resource sets (CORESETs), receiving, from the base station based on transmission of the UE capability, a configuration for receiving the multiple related downlink control channel transmissions, and monitoring a downlink control channel in accordance with the configuration.

An apparatus for wireless communication at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to transmit, to a base station, a UE capability to support receipt of multiple related downlink control channel transmissions, where the multiple related downlink control channel transmissions that are supported include one or more of SFN downlink control channel transmissions, intra-slot downlink control channel repetitions, or inter-slot downlink control channel repetitions, and are associated with one or more CORESETs, receive, from the base station based on transmission of the UE capability, a configuration for receiving the multiple related downlink control channel transmissions, and monitor a downlink control channel in accordance with the configuration.

Another apparatus for wireless communication at a UE is described. The apparatus may include means for transmitting, to a base station, a UE capability to support receipt of multiple related downlink control channel transmissions, where the multiple related downlink control channel transmissions that are supported include one or more of SFN downlink control channel transmissions, intra-slot downlink control channel repetitions, or inter-slot downlink control channel repetitions, and are associated with one or more CORESETs, means for receiving, from the base station based on transmission of the UE capability, a configuration for receiving the multiple related downlink control channel transmissions, and means for monitoring a downlink control channel in accordance with the configuration.

A non-transitory computer-readable medium storing code for wireless communication at a UE is described. The code may include instructions executable by at least one processor to transmit, to a base station, a UE capability to support receipt of multiple related downlink control channel transmissions, where the multiple related downlink control channel transmissions that are supported include one or more of SFN downlink control channel transmissions, intra-slot downlink control channel repetitions, or inter-slot downlink control channel repetitions, and are associated with one or more CORESETs, receive, from the base station based on transmission of the UE capability, a configuration for receiving the multiple related downlink control channel transmissions, and monitor a downlink control channel in accordance with the configuration.

Some examples of the method, apparatuses, and non-transitory computer-readable medium described herein may further include operations, features, means, or instructions for transmitting, as part of the UE capability, an indication that the UE supports receipt of multiple related downlink control channel transmissions which may be associated with three or more CORESETs, where the three or more CORESETs may be associated with a common bandwidth part (BWP), where receiving the configuration may be based on the indication that the UE supports receipt of multiple related downlink control channel transmissions which may be associated with the three or more CORESETs.

In some examples of the method, apparatuses, and non-transitory computer-readable medium described herein, the UE capability indicates that the UE supports receipt of inter-slot downlink control channel repetitions and the method, apparatuses, and non-transitory computer-readable medium may include further operations, features, means, or instructions for receiving, from the base station, an indication of a first search space set and a second search space set associated with the first search space set, where a first monitoring occasion of the first search space set in a first slot may be associated with a second monitoring occasion of the second search space set in a second slot different from the first slot, where the monitoring may be based on the indication of the first search space set, the second search space set, or both.

Some examples of the method, apparatuses, and non-transitory computer-readable medium described herein may further include operations, features, means, or instructions for transmitting, as part of the UE capability, an indication of a quantity of slots between a first downlink control channel transmission and a second downlink control channel transmission associated with the first downlink control channel transmission that may be capable of being decoded by the UE, where receiving the indication of the first search space set, the second search space set, or both, may be based on the quantity of slots.

Some examples of the method, apparatuses, and non-transitory computer-readable medium described herein may further include operations, features, means, or instructions for transmitting, as part of the UE capability, an indication of a maximum number of slots across which the UE supports one or more linked search space sets for inter-slot downlink control channel repetitions in accordance with a search space set periodicity for the one or more linked search space sets.

In some examples of the method, apparatuses, and non-transitory computer-readable medium described herein, the UE capability indicates that the UE supports receipt of intra-slot downlink control channel repetitions and the method, apparatuses, and non-transitory computer-readable medium may include further operations, features, means, or instructions for receiving, from the base station, an indication a first search space set and a second search space set associated with the first search space set, where a first monitoring occasion of the first search space set may be associated with a second monitoring occasion of the second search space set, where both the first monitoring occasion and the second monitoring occasion may be located in a common slot, where the monitoring may be based on the indication of the first search space set, the second search space set, or both.

Some examples of the method, apparatuses, and non-transitory computer-readable medium described herein may further include operations, features, means, or instructions for transmitting, as part of the UE capability, an indication that the UE supports receipt of downlink control channel transmissions which may be received within the first monitoring occasion of the first search space set, the second monitoring occasion of the second search space set, or both, where the first monitoring occasion and the second monitoring occasion at least partially overlap in the time domain, the frequency domain, or both, where receiving the indication of the first search space set, the second search space set, or both, may be based on the indication that the UE supports receipt of downlink control channel transmissions which may be received within the first monitoring occasion of the first search space set, the second monitoring occasion of the second search space set, or both.

Some examples of the method, apparatuses, and non-transitory computer-readable medium described herein may further include operations, features, means, or instructions for transmitting, as part of the UE capability, an indication of a quantity of downlink control channel monitoring occasions within one or more slots which may be monitored by the UE and receiving, from the base station based on the indication of the quantity of downlink control channel monitoring occasions, an indication of a first search space set and a second search space set associated with the first search space set, where the monitoring may be based on the indication of the first search space set, the second search space set, or both.

Some examples of the method, apparatuses, and non-transitory computer-readable medium described herein may further include operations, features, means, or instructions for transmitting, as part of the UE capability, an indication that the UE supports monitoring of a set of UE-specific search space sets, a set of common search space sets, or both and receiving, from the base station, an indication of a first search space set and a second search space set associated with the first search space set based on the indication that the UE supports the monitoring of the set of search space sets which may be associated with the UE, the set of common search space sets, or both, where the monitoring may be based on the indication of the first search space set, the second search space set, or both.

Some examples of the method, apparatuses, and non-transitory computer-readable medium described herein may further include operations, features, means, or instructions for transmitting, as part of the UE capability, an indication of a format for downlink control information (DCI) associated with intra-slot downlink control channel repetitions, inter-slot downlink control channel repetitions, or both and receiving, from the base station based on the indication of the format, an indication of a first search space set and a second search space set associated with the first search space set, where the monitoring may be based on the indication of the first search space set, the second search space set, or both.

Some examples of the method, apparatuses, and non-transitory computer-readable medium described herein may further include operations, features, means, or instructions for transmitting, as part of the UE capability, an indication that the UE supports receipt of a first downlink control channel transmission associated with a first CORESET associated with a first set of parameters, and a second downlink control channel transmission associated with the first downlink control channel transmission and associated with a second CORESET associated with a second set of parameters, where receiving the configuration may be based on the indication that the UE supports receipt of the first downlink control channel transmission and the second downlink control channel transmission.

In some examples of the method, apparatuses, and non-transitory computer-readable medium described herein, the first set of parameters, the second set of parameters, or both, include a CORESET duration, a control channel element-resource element group (CCE-REG) mapping type, a precoding granularity, a CORESET pool index, or any combination thereof.

In some examples of the method, apparatuses, and non-transitory computer-readable medium described herein, the first set of parameters may be different from the second set of parameters.

Some examples of the method, apparatuses, and non-transitory computer-readable medium described herein may further include operations, features, means, or instructions for transmitting, as part of the UE capability, an indication that the UE supports monitoring of a quantity of control channel candidates per span of resources, a quantity of CCEs per span of resources, or both, where receiving the configuration may be based on the indication of the quantity of control channel candidates per span of resources, the quantity of CCEs per span of resources, or both.

Some examples of the method, apparatuses, and non-transitory computer-readable medium described herein may further include operations, features, means, or instructions for transmitting, as part of the UE capability, an indication that the UE supports receipt of multiple related downlink control channel transmissions within a same span of resources, within different spans of resources, or both, where receiving the configuration, monitoring the downlink control channel, or both, is based on the indication.

In some examples of the method, apparatuses, and non-transitory computer-readable medium described herein, the UE capability indicates that the UE supports receipt of SFN downlink control channel transmissions and the method, apparatuses, and non-transitory computer-readable medium may include further operations, features, means, or instructions for receiving, from the base station, an indication of a CORESET including two transmission configuration indicator (TCI) states, where the monitoring may be based on the indication of the CORESET.

In some examples of the method, apparatuses, and non-transitory computer-readable medium described herein, the UE capability indicates that the UE supports receipt of SFN downlink control channel transmissions and the method, apparatuses, and non-transitory computer-readable medium may include further operations, features, means, or instructions for transmitting, as part of the UE capability, an indication of a quantity of CORESETs within a BWP, where receiving the configuration may be based on the indication of the quantity of CORESETs within the BWP.

Some examples of the method, apparatuses, and non-transitory computer-readable medium described herein may further include operations, features, means, or instructions for receiving, from the base station based on the monitoring, a first downlink control channel transmission and a second downlink control channel transmission associated with the first downlink control channel transmission, where the first downlink control channel transmission and the second downlink control channel transmission may be transmitted based on the configuration.

In some examples of the method, apparatuses, and non-transitory computer-readable medium described herein, the multiple related downlink control channel transmissions may be transmitted according to a fifth generation (5G) radio access technology, a New Radio (NR) access technology, or both.

A method for wireless communication at a base station is described. The method may include receiving, from a UE, a UE capability of the UE to support receipt of multiple related downlink control channel transmissions, where the multiple related downlink control channel transmissions that are supported include one or more of SFN downlink control channel transmissions, intra-slot downlink control channel repetitions, or inter-slot downlink control channel repetitions, and are associated with one or more CORESETs, transmitting, to the UE based on reception of the UE capability, a configuration for transmitting the multiple related downlink control channel transmissions, and communicating with the UE via a downlink control channel in accordance with the configuration.

An apparatus for wireless communication at a base station is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to receive, from a UE, a UE capability of the UE to support receipt of multiple related downlink control channel transmissions, where the multiple related downlink control channel transmissions that are supported include one or more of SFN downlink control channel transmissions, intra-slot downlink control channel repetitions, or inter-slot downlink control channel repetitions, and are associated with one or more CORESETs, transmit, to the UE based on reception of the UE capability, a configuration for transmitting the multiple related downlink control channel transmissions, and communicate with the UE via a downlink control channel in accordance with the configuration.

Another apparatus for wireless communication at a base station is described. The apparatus may include means for receiving, from a UE, a UE capability of the UE to support receipt of multiple related downlink control channel transmissions, where the multiple related downlink control channel transmissions that are supported include one or more of SFN downlink control channel transmissions, intra-slot downlink control channel repetitions, or inter-slot downlink control channel repetitions, and are associated with one or more CORESETs, means for transmitting, to the UE based on reception of the UE capability, a configuration for transmitting the multiple related downlink control channel transmissions, and means for communicating with the UE via a downlink control channel in accordance with the configuration.

A non-transitory computer-readable medium storing code for wireless communication at a base station is described. The code may include instructions executable by at least one processor to receive, from a UE, a UE capability of the UE to support receipt of multiple related downlink control channel transmissions, where the multiple related downlink control channel transmissions that are supported include one or more of SFN downlink control channel transmissions, intra-slot downlink control channel repetitions, or inter-slot downlink control channel repetitions, and are associated with one or more CORESETs, transmit, to the UE based on reception of the UE capability, a configuration for transmitting the multiple related downlink control channel transmissions, and communicate with the UE via a downlink control channel in accordance with the configuration.

Some examples of the method, apparatuses, and non-transitory computer-readable medium described herein may further include operations, features, means, or instructions for receiving, as part of the UE capability, an indication that the UE supports receipt of multiple related downlink control channel transmissions which may be associated with three or more CORESETs, where the three or more CORESETs may be associated with a common BWP, where transmitting the configuration may be based on the indication that the UE supports receipt of multiple related downlink control channel transmissions which may be associated with the three or more CORESETs.

In some examples of the method, apparatuses, and non-transitory computer-readable medium described herein, the UE capability indicates that the UE supports receipt of inter-slot downlink control channel repetitions and the method, apparatuses, and non-transitory computer-readable medium may include further operations, features, means, or instructions for transmitting, to the UE, an indication of a first search space set and a second search space set associated with the first search space set, where a first monitoring occasion of the first search space set in a first slot may be associated with a second monitoring occasion of the second search space set in a second slot different from the first slot, where the communicating may be based on the indication of the first search space set, the second search space set, or both.

Some examples of the method, apparatuses, and non-transitory computer-readable medium described herein may further include operations, features, means, or instructions for receiving, as part of the UE capability, an indication of a quantity of slots between a first downlink control channel transmission and a second downlink control channel transmission associated with the first downlink control channel transmission that may be capable of being decoded by the UE, where transmitting the indication of the first search space set, the second search space set, or both, may be based on the quantity of slots.

Some examples of the method, apparatuses, and non-transitory computer-readable medium described herein may further include operations, features, means, or instructions for receiving, as part of the UE capability, an indication of a maximum number of slots across which the UE supports one or more linked search space sets for inter-slot downlink control channel repetitions in accordance with a search space set periodicity for the one or more linked search space sets.

In some examples of the method, apparatuses, and non-transitory computer-readable medium described herein, the UE capability indicates that the UE supports receipt of intra-slot downlink control channel repetitions and the method, apparatuses, and non-transitory computer-readable medium may include further operations, features, means, or instructions for transmitting, to the UE, an indication a first search space set and a second search space set associated with the first search space set, where a first monitoring occasion of the first search space set may be associated with a second monitoring occasion of the second search space set, where both the first monitoring occasion and the second monitoring occasion may be located in a common slot, where the communicating may be based on the indication of the first search space set, the second search space set, or both.

Some examples of the method, apparatuses, and non-transitory computer-readable medium described herein may further include operations, features, means, or instructions for receiving, as part of the UE capability, an indication that the UE supports receipt of downlink control channel transmissions which may be received within the first monitoring occasion of the first search space set, the second monitoring occasion of the second search space set, or both, where the first monitoring occasion and the second monitoring occasion at least partially overlap in the time domain, the frequency domain, or both, where transmitting the indication of the first search space set, the second search space set, or both, may be based on the indication that the UE supports receipt of downlink control channel transmissions which may be received within the first monitoring occasion of the first search space set, the second monitoring occasion of the second search space set, or both.

Some examples of the method, apparatuses, and non-transitory computer-readable medium described herein may further include operations, features, means, or instructions for receiving, as part of the UE capability, an indication of a quantity of downlink control channel monitoring occasions within the one or more slots which may be monitored by the UE and transmitting, to the UE based on the indication of the quantity of downlink control channel monitoring occasions, an indication of a first search space set and a second search space set associated with the first search space set, where communicating with the UE may be based on the indication of the first search space set, the second search space set, or both.

Some examples of the method, apparatuses, and non-transitory computer-readable medium described herein may further include operations, features, means, or instructions for receiving, as part of the UE capability, an indication that the UE supports monitoring of a set of UE-specific search space sets, a set of common search space sets, or both and transmitting, to the UE, an indication of a first search space set and a second search space set associated with the first search space set based on the indication that the UE supports the monitoring of the set of search space sets which may be associated with the UE, the set of common search space sets, or both, where communicating with the UE may be based on the indication of the first search space set, the second search space set, or both.

Some examples of the method, apparatuses, and non-transitory computer-readable medium described herein may further include operations, features, means, or instructions for receiving, as part of the UE capability, an indication of a format for DCI associated with intra-slot downlink control channel repetitions, inter-slot downlink control channel repetitions, or both and transmitting, to the UE based on the indication of the format, an indication of a first search space set and a second search space set associated with the first search space set, where communicating with the UE may be based on the indication of the first search space set, the second search space set, or both.

Some examples of the method, apparatuses, and non-transitory computer-readable medium described herein may further include operations, features, means, or instructions for receiving, as part of the UE capability, an indication that the UE supports receipt of a first downlink control channel transmission associated with a first CORESET associated with a first set of parameters, and a second downlink control channel transmission associated with the first downlink control channel transmission and associated with a second CORESET associated with a second set of parameters, where transmitting the configuration may be based on the indication that the UE supports receipt of the first downlink control channel transmission and the second downlink control channel transmission.

In some examples of the method, apparatuses, and non-transitory computer-readable medium described herein, the first set of parameters, the second set of parameters, or both, include a CORESET duration, a CCE-REG mapping type, a precoding granularity, a CORESET pool index, or any combination thereof.

In some examples of the method, apparatuses, and non-transitory computer-readable medium described herein, the first set of parameters may be different from the second set of parameters.

Some examples of the method, apparatuses, and non-transitory computer-readable medium described herein may further include operations, features, means, or instructions for receiving, as part of the UE capability, an indication that the UE supports monitoring of a quantity of control channel candidates per span of resources, a quantity of CCEs per span of resources, or both, where transmitting the configuration may be based on the indication of the quantity of control channel candidates per span of resources, the quantity of CCEs per span of resources, or both.

In some examples of the method, apparatuses, and non-transitory computer-readable medium described herein, the UE capability indicates that the UE supports receipt of SFN downlink control channel transmissions and the method, apparatuses, and non-transitory computer-readable medium may include further operations, features, means, or instructions for transmitting, to the UE, an indication of a CORESET including two TCI states, where the communicating may be based on the indication of the CORESET.

In some examples of the method, apparatuses, and non-transitory computer-readable medium described herein, the UE capability indicates that the UE supports receipt of SFN downlink control channel transmissions and the method, apparatuses, and non-transitory computer-readable medium may include further operations, features, means, or instructions for receiving, as part of the UE capability, an indication of a quantity of CORESETs within a BWP, where transmitting the configuration may be based on the indication of the quantity of CORESETs within the BWP.

In some examples of the method, apparatuses, and non-transitory computer-readable medium described herein, communicating with the UE may include operations, features, means, or instructions for transmitting, to the UE, a first downlink control channel transmission and a second downlink control channel transmission associated with the first downlink control channel transmission, where the first downlink control channel transmission and the second downlink control channel transmission may be transmitted based on the configuration.

In some examples of the method, apparatuses, and non-transitory computer-readable medium described herein, the multiple related downlink control channel transmissions may be transmitted according to a 5G radio access technology, an NR access technology, or both.

DETAILED DESCRIPTION

Figure 1:
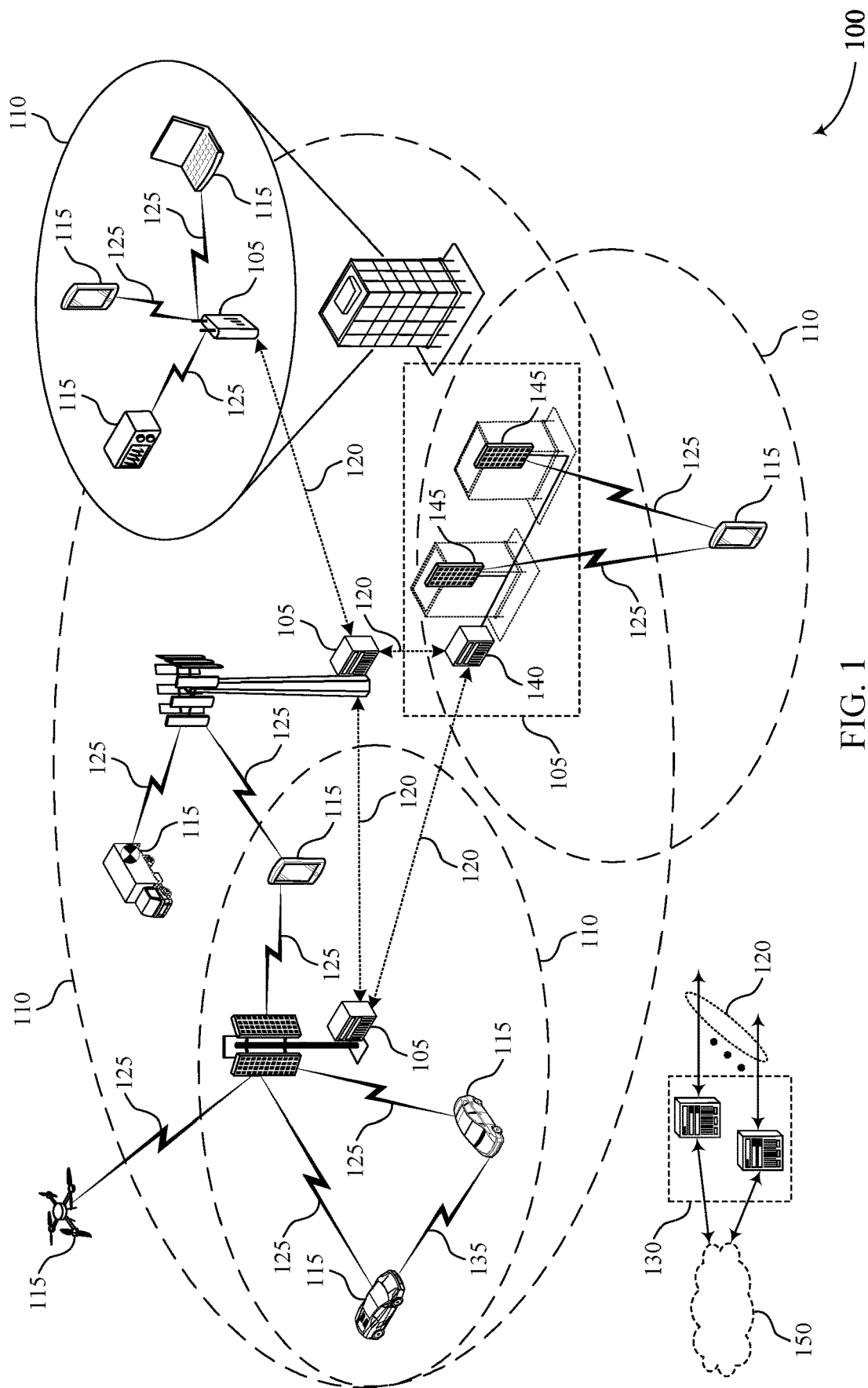
FIG. 1 illustrates an example of a wireless communications system that supports techniques for signaling user equipment capability for physical downlink control channel (PDCCH) repetition in accordance with aspects of the present disclosure.

Some wireless systems may support the repetition of various signals, such as control information or data. For example, multiple repetitions of a physical downlink control channel (PDCCH) transmission may be transmitted within a single slot (e.g., intra-slot PDCCH repetition), across multiple slots (e.g., inter-slot PDCCH repetition), or both. By way of another example, in the context of single frequency networks (SFN), a base station may transmit multiple linked (e.g., related) PDCCH transmissions, where each PDCCH transmission is associated with two transmission configuration indicators (TCIs). In these cases, a user equipment (UE) may receive and combine the multiple related PDCCH transmissions (e.g., PDCCH repetitions), which may serve to enhance reliability in the system and also provide transmission diversity for protection against interference.

However, not all UEs and other wireless devices may have the capability to receive and/or decode inter-slot PDCCH repetitions, intra-slot PDCCH repetitions, SFN PDCCH transmissions, or any combination thereof. Moreover, some UEs may be able to receive and/or decode related PDCCH transmissions according to one configuration, but another (e.g., a UE may support intra-slot PDCCH repletion, but not inter-slot PDCCH repetition). Accordingly, in some wireless communications systems, a network may not be aware of which UEs are capable of supporting SFN PDCCH transmissions, inter-slot PDCCH repetitions, or intra-slot PDCCH repetitions. As such, the network may refrain from communicating with the UEs via SFN PDCCH transmissions, inter-slot PDCCH repetitions, or intra-slot PDCCH repetitions, which may reduce a reliability of wireless communications within the wireless communications system and reduce transmission diversity.

Accordingly, techniques described herein may provide for signaling and other techniques which enable a UE to inform the network that the UE is able to support receipt of SFN PDCCH transmissions, inter-slot PDCCH repetitions, or intra-slot PDCCH repetitions, or any combination thereof. In some aspects, a UE may indicate a capability to receive/ decode multiple related downlink control channel transmissions using a UE capability report which indicates that the UE is able to receive multiple PDCCH repetitions, including SFN PDCCH transmissions, inter-slot PDCCH repetitions, and/or intra-slot PDCCH repetitions. Based on the indicated UE capability, the UE may receive a configuration for receiving multiple related PDCCH transmissions, and may monitor a PDCCH in accordance with the configuration.

In some implementations, and in addition to indicating the types of multiple related PDCCH transmissions that are supported, the UE capability transmitted to the network may indicate additional parameters associated with each of the supported configurations. For example, the UE capability may indicate a maximum quantity of slots between related PDCCH transmissions, whether search space sets for related PDCCH transmissions may be overlapping in time/frequency, a maximum number of monitoring occasions within a single slot it may support, supported downlink control information (DCI) formats for related PDCCH transmissions, whether control resource sets (CORESETS) for related PDCCH transmissions may be the same or different, and the like.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for signaling user equipment capability for PDCCH repetition.

FIG. 1 illustrates an example of a wireless communications system 100 that supports techniques for signaling user equipment capability for PDCCH repetition in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (e.g., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets. Components within a wireless communication system may be coupled (for example, operatively, communicatively, functionally, electronically, and/or electrically) to each other.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, a UE 115 of the wireless communications system 100 may be configured with up to three CORESETS within a given BWP. A CORESET may include one or more TCI states for PDCCH repetition, and may be associated with a quantity of resource blocks (RBs) in the frequency domain, and a quantity of symbols or other TTI in the time domain (e.g., quantity of OFDM symbols). In some aspects, a CORESET configured at the UE 115 may be associated with a CCE resource element group (CCE-REG) mapping type (e.g., CCE-REG bundle mapping type), a precoding granularity, an identifier (e.g., scrambling identifier) associated with scrambling for PDCCH demodulation reference signals (DMRS), coded bits of downlink control information (DCI) content, or any combination thereof.

In some aspects, a UE 115 may be configured with up to ten search space sets within a given BWP. In some aspects, each search space set may be associated with a given CORESET, and may include a set of monitoring occasions. In some aspects, a search space set may include a set of control channel monitoring occasions (e.g., PDCCH monitoring occasions). Moreover, a UE 115 may be configured to determine the control channel monitoring occasions associated with a given search space set based on one or more characteristics of the search space set which may be configured (e.g., pre-configured) at the UE 115, indicated to the UE 115 via a base station 105, or both. A UE 115 may be configured with one or more different types of search space sets (e.g., searchSpaceType), including UE-specific search space sets, common search space sets, or both. Additionally, each search space set may be associated with one or more DCI formats which are to be monitored.

Parameters of a search space set (s) may include a periodicity ($k_s$) of monitoring occasions (e.g., $k_s$ slots), an offset ($o_s$) for monitoring occasions in units of slots (e.g., $o_s$ slots) (e.g., monitoringSlotPeriodicityAndOffset), a duration ($T_s$) indicative of a quantity of slots within a period in which the search space set exists (where $T_s < k_s$), or any combination thereof. A UE 115 of the wireless communications system 100 may determine a quantity of PDCCH monitoring occasions within a slot $\eta_{s,f}^\mu$ and a frame $\eta_f$ if $\eta_f \cdot N_{slot}^{frame,\mu} + \eta_{s,f}^\mu o_s$ mod $k_s = 0$. In some aspects, when monitoring a control channel, a UE 115 may be configured to monitor control channel candidates (e.g., PDCCH candidates) for a search space set s for $T_s$ consecutive slots, starting from slot $\mu_{s,f}^\mu$, and may refrain from monitoring control channel candidates for the search space set s for the next $k_s - T_s$ consecutive slots. Quantities of control channel candidates (e.g., PDCCH candidates) may be based on an aggregation level (e.g., quantity of CCEs) of wireless communications at the UE 115.

In some aspects, a UE 115 may be configured to monitor a control channel according to a control channel monitoring pattern (e.g., PDCCH monitoring pattern) within a slot (e.g., monitoringSymbolsWithinSlot). For example, a PDCCH monitoring pattern within a slot may indicate a first symbol(s) of a CORESET within a slot for PDCCH monitoring. For instance, in the context of a slot including fourteen symbols, a CORESET configured at a UE 115 may be associated with a search space set including three symbols, and a control channel monitoring pattern (e.g., monitoringSymbolsWithinSlot) associated with the search space set may be configured as "01000010001000." In this example, the UE 115 may be configured to determine that there are three monitoring occasions within each slot that the search space set exists. Moreover, the UE 115 may be configured to determine that the three monitoring occasions begin at the second, seventh, and eleventh symbols of each respective slot that the search space exists.

In the context of a SFN, SFN PDCCH transmissions (e.g., PDCCH DMRS) may be associated with two TCI states. In particular, for SFN PDCCH transmissions, one CORESET may be activated at UE 115 with two active TCI states. In such cases, each control channel candidate (e.g., PDCCH candidate) of a search space set associated with the CORESET may be associated with the two active TCI states of the CORESET.

Similarly, for PDCCH repetitions in which each PDCCH repetition includes a PDCCH candidate, two PDCCH candidates (e.g., two PDCCH repetitions) may be linked (e.g., related) together for possible repetitions of the same control channel transmission (e.g., repetitions of DCI). In the context of PDCCH repetitions, the payload (e.g., DCI payload) of the two PDCCH candidates (e.g., two PDCCH repetitions) may be the same. For example, a first PDCCH candidate may be related, or linked, to a second PDCCH candidate. In this example, a first repetition of DCI may be transmitted in the first PDCCH candidate, and a second repetition of DCI may be transmitted in the second PDCCH candidate, where the first and second repetitions of DCI are the same. In this example, a UE 115 may receive and/or decode only the first repetition of DCI or only the second repetition of DCI. Additionally, or alternatively, the UE 115 may receive and/or decode both the first and second repetitions of DCI by performing soft combining of the first and second repetitions of DCI. In some aspects, related/linked PDCCH candidates may have the same aggregation level (e.g., same quantities of CCEs).

In some aspects related PDCCH candidates in different search space sets which are associated with corresponding CORESETs may be linked together (e.g., related) for PDCCH repetition. In some cases, two PDCCH candidates with a same candidate index across two related search space sets may be linked or related. In other cases, PDCCH candidates with a same start CCE index may be linked. In some aspects, sets of related/linked PDCCH candidates may be configured via control signaling (e.g., RRC signaling). For example, a UE 115 may receive an RRC message which indicates that a first PDCCH candidate in a first search space set is linked with (e.g., related to) a second PDCCH candidate in a second search space set. Moreover, UEs 115 may be configured with sets of linked/related PDCCH candidates which are within a same slot or TTI (e.g., intra-slot PDCCH repetition), sets of linked/related PDCCH candidates which are in different slots (e.g., intra-slot PDCCH repetition), or both.

In some aspects, the UEs 115 and the base stations 105 of the wireless communications system 100 may support signaling and other techniques which enable a UE 115 to inform the network (e.g., base stations 105) that the UE 115 is able to support receipt of SFN PDCCH transmissions, inter-slot PDCCH repetitions, or intra-slot PDCCH repetitions, or any combination thereof. For example, in some aspects, a UE 115 may indicate a capability to receive/decode multiple related downlink control channel transmissions using a UE capability report which indicates that the UE 115 is able to receive multiple PDCCH repetitions, including SFN PDCCH transmissions, inter-slot PDCCH repetitions, and/or intra-slot PDCCH repetitions. Based on the indicated UE capability, the UE 115 may receive, from a base station 105, a configuration for receiving multiple related PDCCH transmissions, and may monitor a PDCCH in accordance with the configuration. For instance, in cases where the UE 115 indicates it supports inter-slot PDCCH repetitions, the UE 115 may receive a first repetition of a PDCCH transmission in a first transmission time interval (TTI) (e.g., first slot), and may receive a second repetition of the PDCCH transmission in a second TTI (e.g., second slot). By way of another example, in cases where the UE 115 indicates it supports intra-slot PDCCH repetitions, the UE 115 may receive a first repetition of a PDCCH transmission and a second repetition of the PDCCH transmission in common TTI (e.g., common slot).

In some implementations, the UE capability transmitted by a UE 115 to the network (e.g., to a base station 105) may indicate additional parameters associated with each of the supported configurations. For example, the UE capability may indicate a maximum quantity of slots between related PDCCH transmissions, whether search space sets for related PDCCH transmissions may be overlapping in time/frequency, a maximum number of monitoring occasions within a single slot it may support, supported downlink control information (DCI) formats for related PDCCH transmissions, whether control resource sets (CORESETS) for related PDCCH transmissions may be the same or different, and the like.

Techniques described herein may provide for improved scheduling of wireless communications. In particular, by enabling a UE 115 to inform the network (e.g., base station 105) its capability to support one or more configurations for PDCCH repetition (e.g., SFN PDCCH transmissions, inter-slot PDCCH repetitions, intra-slot PDCCH repetitions), techniques described herein may enable the network to communicate with the UE 115 using the respective configurations for PDCCH repetitions depending on the characteristics of the network (e.g., quantity of data traffic, noise) as well as the capabilities of the UE 115. Thus, techniques described herein may enable more widespread use of communications using PDCCH repetitions within the wireless communications system 100, thereby improving a reliability of wireless communications, improving transmission diversity, and further protecting wireless communications against interference.

Figure 2:
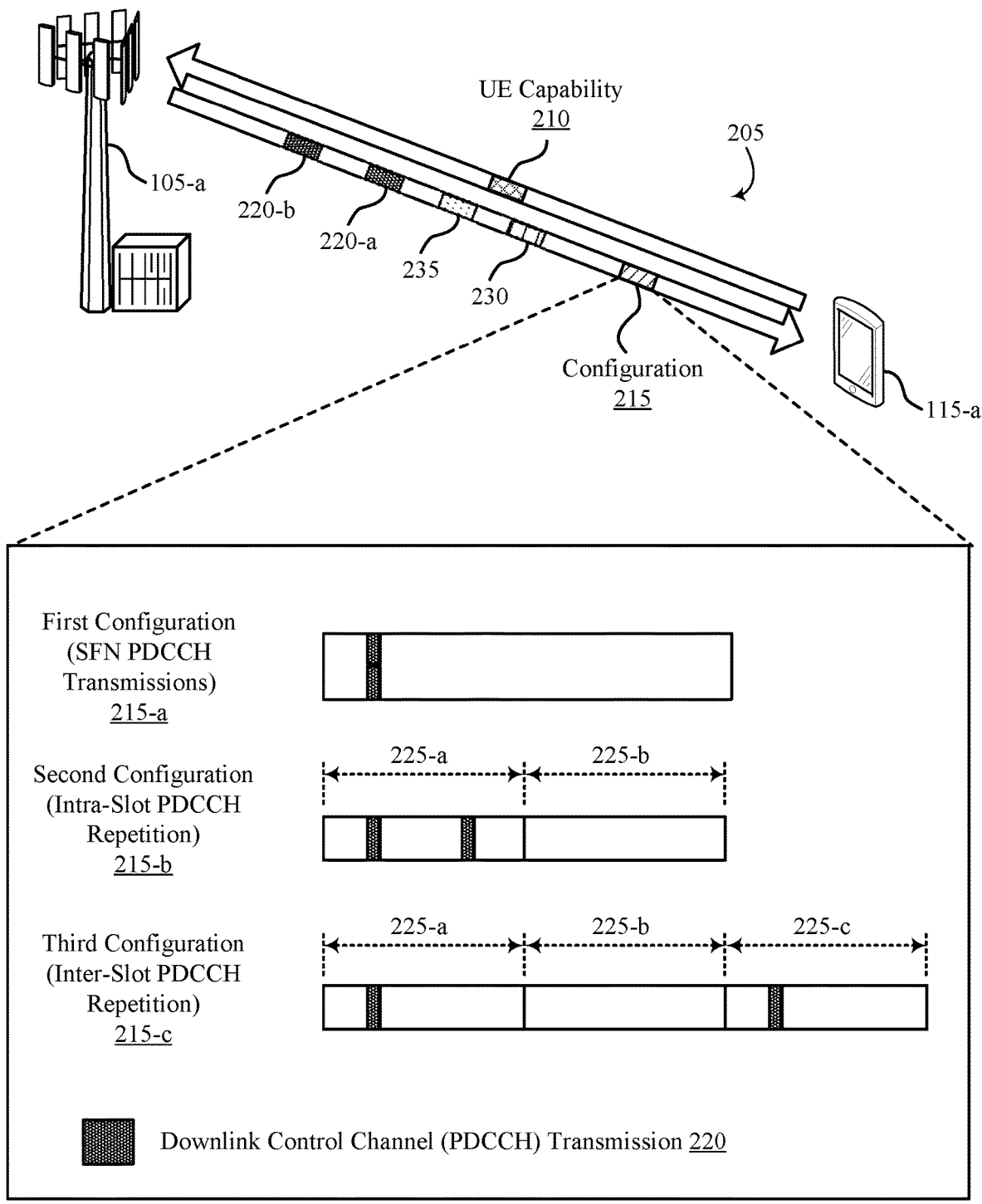
FIG. 2 illustrates an example of a wireless communications system that supports techniques for signaling user equipment capability for PDCCH repetition in accordance with aspects of the present disclosure.

FIG. 2 illustrates an example of a wireless communications system 200 that supports techniques for signaling user equipment capability for PDCCH repetition in accordance with aspects of the present disclosure. In some examples, wireless communications system 200 may implement, or be implemented by, aspects of wireless communications system 100. For example, wireless communications system 200 may support signaling which enables a UE 115 to indicate a capability to support SFN PDCCH transmissions, inter-slot PDCCH repetitions, intra-slot PDCCH repetitions, or any combination thereof.

The wireless communications system 200 may include a base station 105-a and a UE 115-a, which may be examples base stations 105 and UEs 115 as described with reference to FIG. 1. The UE 115-a may communicate with the base station 105-a using a communication link 205, which may be an example of an NR or LTE link between the UE 115-a and the base station 105-a. In some cases, the communication link 205 between the UE 115-a and the base station 105-a may include an example of an access link (e.g., Uu link) which may include a bi-directional link that enables both uplink and downlink communication. For example, the UE 115-a may transmit uplink signals, such as uplink control signals or uplink data signals, to the base station 105-a using the communication link 205 and the base station 105-a may transmit downlink signals, such as downlink control signals or downlink data signals, to the UE 115-a using the communication link 205.

In some aspects, the wireless communications system 200 may support signaling which enables the UE 115-a to indicate, to the base station 105-a, whether it supports receipt of SFN PDCCH transmissions, inter-slot PDCCH repetitions, or intra-slot PDCCH repetitions, or any combination thereof. For example, in some aspects, a UE 115 may indicate a capability to receive/decode multiple related downlink control channel transmissions using a UE capability report which indicates that the UE 115 is able to receive multiple PDCCH repetitions, including SFN PDCCH transmissions, inter-slot PDCCH repetitions, and/or intra-slot PDCCH repetitions. Subsequently, the base station 105-a may be configured to transmit, to the UE 115-a, a configuration (e.g., configuration for SFN PDCCH transmissions, configuration for inter-slot PDCCH repetition, configuration for intra-slot PDCCH repetition), which may enable the UE 115-a and the base station 105-a to communicate according to the indicated configuration. By enabling the UE 115-a to indicate, to the base station 105-a, various capabilities and/or parameters associated with a SFN PDCCH transmissions, inter-slot PDCCH repetitions, and/or intra-slot PDCCH repetitions, techniques described herein may enable improved scheduling of wireless communications at the UE 115-a and enable more widespread use of PDCCH repetitions.

For example, the UE 115-a may transmit a UE capability 210 indicating that the UE 115-a supports receipt of multiple related downlink control channel transmissions (e.g., multiple related PDCCH transmissions 220) which are associated with one or more CORESETs. In some aspects, the UE capability 210 may be indicated via a UE capability report. In some aspects, the UE capability 210 may indicate that it can receive and/or decode SFN downlink control channel transmissions (e.g., SFN PDCCH transmissions), intra-slot downlink control channel repetitions (e.g., intra-slot PDCCH repetitions), inter-slot downlink control channel repetitions (e.g., inter-slot PDCCH repetitions), or any combination thereof.

In this regard, the UE capability 210 may indicate that the UE 115-a supports a first configuration 215-a for receiving/decoding SFN PDCCH transmissions, a second configuration 215-b for receiving/decoding intra-slot PDCCH repetitions, and/or a third configuration 215-c for receiving/decoding inter-slot PDCCH repetitions. As shown in FIG. 2, in cases where the UE 115-a supports the first configuration 215-a for receiving/decoding SFN PDCCH transmissions, the UE 115-a may be able to receive and/or decode a first SFN PDCCH transmission 220, and a second SFN PDCCH transmission 220 which is related to the first SFN PDCCH transmission 220. In the context of SFN PDCCH transmissions 220, the same coded bits may be transmitted within a common set of resource elements (e.g., within a common set of CCEs and/or CCE-REGs). In such cases, SFN PDCCH transmissions 220 may be associated with two TCI states (e.g., two beams), where the UE 115-a receives a combined signal of the respective SFN PDCCH transmissions 220, which may improve channel estimation.

In cases where the UE 115-a supports the second configuration 215-b for receiving/decoding intra-slot PDCCH repetitions, the UE 115-a may be able to receive and/or decode a first PDCCH transmission 220 and a second PDCCH transmission 220 in a common slot 225 (e.g., first slot 225-a), where the first and second PDCCH transmissions 220 are associated with one another (e.g., linked). Similarly, in cases where the UE 115-a supports the third configuration 215-c for receiving/decoding inter-slot PDCCH repetitions, the UE 115-a may be able to receive and/or decode a first PDCCH transmission 220 in a first slot 225-a, and a second PDCCH transmission 220 in a different slot (e.g., second slot 225-b, third slot 225-c), where the first and second PDCCH transmissions 220 are associated with one another (e.g., linked).

In some cases, a network (e.g., wireless communications system 200) may be configured with one or more standardized configurations for receiving/decoding multiple related downlink control channel transmissions. In such cases, the UE capability 210 may indicate that the UE 115-a supports one or more of the configurations for receiving/decoding multiple related PDCCH transmissions 220 via one or more bit field values of a UE capability report.

In some aspects, the UE capability 210 may indicate that the UE supports receipt of SFN downlink control channel transmissions. In other words, the UE capability 210 may indicate that the UE 115-a supports the first configuration 215-a for SFN PDCCH transmissions 220. As noted previously herein, in the context of SFN, each PDCCH transmission 220 (e.g., PDCCH DMRS) may be associated with two TCI states. In such cases, the UE capability 210 may include an indication of a quantity of CORESETs within a BWP which may be configured at the UE 115-a. In particular, the UE capability 210 may include an indication of a quantity of CORESETs within a BWP which may simultaneously be associated with two active TCI states for SFN PDCCH transmissions 220.

In some cases, the UE capability 210 may indicate that the UE supports receipt of intra-slot downlink control channel transmissions, inter-slot downlink control channel transmissions, or both. In other words, the UE capability 210 may indicate that the UE 115-a supports the second configuration 215-b for intra-slot PDCCH repetitions, the third configuration 215-c for intra-slot PDCCH repetitions, or both. In such cases, the UE capability 210 may include one or more parameters associated with intra-slot and/or inter-slot PDCCH repetitions (e.g., parameters associated with the second configuration 215-b and/or the third configuration 215-c) including, but not limited to, quantities (e.g., maximum quantity) of downlink control channel monitoring occasions (e.g., PDCCH monitoring occasions) within one or more slots 225 which may be monitored by the UE 115-a, indications that the UE 115-a does or does not support monitoring of UE-specific search space sets and/or common search space sets, a format (e.g., DCI formats including DCI 1_0, DCI 2_0, DCI 3_0, etc.) for downlink control information associated with intra-slot and/or inter-slot downlink control channel repetitions, or any combination thereof.

For example, the UE capability 210 may indicate a maximum number of PDCCH monitoring occasions within a slot 225 which can be configured for a search space set that is linked with another search space set for inter-slot and/or intra-slot PDCCH repetitions. The indication of a maximum number of PDCCH monitoring occasions which may be monitored by the UE 115-*a* may determine allowable values of RRC parameters (e.g., monitoringSymbolsWithinSlot) which the base station 105-*a* may configure for the related/ linked search space sets. By way of another example, the UE capability 210 may indicate that the UE 115-*a* may receive and/or decode UE-specific search space sets and/or common search space sets for inter-slot PDCCH repetition, intra-slot PDCCH repetition, or both. By way of another example, the UE capability 210 may indicate which DCI formats the UE 115-*a* may receive/decode for inter-slot and/or intra-slot PDCCH repetitions. In some aspects, the indication of the DCI format may determine allowable values of RRC parameters (e.g., searchSpaceType) which the base station 105-*a* may configure for the related/linked search space sets.

The UE capability 210 may indicate one or more parameters associated with sets of CORESETs which are linked for inter-slot and/or intra-slot PDCCH repetition. For example, the UE capability 210 may indicate that the UE 115-*a* supports receipt of a first PDCCH transmission 220 associated with a first CORESET, and a second PDCCH transmission 220 associated with a second CORESET, where the first and second PDCCH transmissions 220 are related or linked. In this example, the UE capability 210 may indicate a first set of parameters associate with the first CORESET, and a second set of parameters associated with the second CORESET. In some cases, the first and second sets of parameters may be the same or different. The parameters associated with the respective CORESETs may include, but are not limited to, CORESET durations, CCE-REG mapping types, precoding granularity, CORESET pool indexes, or any combination thereof.

For instance, the UE capability 210 may indicate a quantity of symbols of the respective CORESETs (e.g., CORESET duration). The UE capability 210 may indicate if the CORESET durations of the first CORESET and the second CORESET for inter-slot and/or intra-slot PDCCH repetition should be the same, if they may be different, or if the UE 115-*a* supports both. By way of another example, the UE capability 210 may indicate whether CCE-REG mapping types (e.g., CCE-REG bundling mapping type) and/or precoding granularities of the first CORESET and the second CORESET that are associated with the linked search space sets for inter-slot and/or intra-slot PDCCH repetition may be the same, and/or if they may be different.

Similarly, the UE capability 210 may indicate whether the first CORESET and the second CORESET that are associated with the linked search space sets for inter-slot and/or intra-slot PDCCH repetition may be configured with CORESET pool index values (e.g., CORESETPoolIndex values). In some aspects, CORESET pool indexes may be representative of TRP IDs for multi-DCI based multi-TRP UEs 115, such that CORESETs which are configured with CORESET pool index values may effectively divide the CORESET into two or more groups. In cases where the UE 115-*a* indicates that it may be configured with CORESET pool index values for inter-slot and/or intra-slot PDCCH repetitions, the UE capability 210 may additionally indicate whether CORESET pool indexes for the first CORESET and the second CORESET that are associated with the linked search space sets for inter-slot and/or intra-slot PDCCH repetition may be the same, and/or if they may be different.

Additionally, or alternatively, in cases where the UE capability 210 indicates that the UE 115-*a* supports inter-slot and/or intra-slot PDCCH repetition (e.g., supports the second configuration 215-*b* and/or the third configuration 215-*c*), the UE capability 210 may additionally indicate whether the UE 115-*a* supports more than three CORESETs within an active BWP of a serving cell (and/or component carrier) supported by the base station 105-*a*. For example, the UE capability 210 may indicate that the UE 115-*a* supports receipt of multiple related downlink control channel transmissions (e.g., PDCCH transmissions 220) which are associated with three or more CORESETs, where the three or more CORESETs are associated with a common BWP. In some aspects, the ability to support three (or more) CORESETs within a BWP may be applicable to a primary serving cell of the base station 105-*a*. Moreover, in some implementations, the ability to support three (or more) CORESETs within a BWP may be applicable to only wireless communications performed within the FR2 frequency range. In particular, for FR2 communications, one CORESET may be dedicated for beam failure recovery (BFR), and one CORESET (e.g., CORESET0) may be dedicated for broadcast PDCCH (which generally utilize a wide beam). Thus, for FR2 communications in which three CORESETs are configured for a BWP, only one CORESET may be utilized for repetitions of downlink control channel transmissions (assuming that a narrow beams are to be used).

Furthermore, in cases where the UE capability 210 indicates that the UE 115-*a* supports inter-slot and/or intra-slot PDCCH repetition, the UE capability 210 may additionally indicate whether the UE 115-*a* supports span-based PDCCH monitoring within a serving cell configured for inter-slot and/or intra-slot PDCCH repetition. In particular, the UE capability 210 may indicate a maximum quantity of control channel candidates and/or CCEs (e.g., non-overlapping CCEs) per span of resources (e.g., span of time resources, span of frequency resources) which may be monitored or blindly decoded by the UE 115-*a*. For example, the UE capability 210 may indicate that the UE 115-*a* supports monitoring of a quantity of control channel candidates per span of resources, a quantity of CCEs per span of resources, or both. In such cases, the UE capability 210 may indicate whether PDCCH repetitions may be monitored/decoded within a same span of resources, within different spans of resources, or both.

As noted previously herein, the UE 115-*a* may be able to decode multiple repetitions of related PDCCH transmissions 220 (e.g., first repetition of DCI, second repetition of DCI) by performing soft combining of the respective PDCCH transmissions 220. As such, by supporting inter-slot and/or intra-slot PDCCH repetitions, the UE 115-*a* may be configured to store a soft output of a PDCCH candidate/repetition for a certain amount of time in order to combine the soft output with a later-received PDCCH candidate/repetition. The ability to store soft outputs of PDCCH repetitions may be particularly important in the context of inter-slot PDCCH repetitions (third configuration 215-*c*), in which the related/ linked PDCCH repetitions are located in different slots 225. For instance, the UE 115-*a* may only have the storage capacity and/or processing capability to store a soft output of a first repetition of a PDCCH transmission 220 for three slots 225, and may therefore be unable to receive inter-slot PDCCH repetitions where the repetitions are separated by more than three slots 225.

Accordingly, in cases where the UE capability 210 indicates that the UE supports receipt of inter-slot control channel repetitions (e.g., UE 115-a supports the third configuration 215-c for inter-slot PDCCH repetitions), the UE capability 210 may additionally indicate a quantity of slots 225 between linked/related downlink control channel transmissions which are capable of being blindly decoded. In particular, the UE capability 210 may indicate whether repetitions of PDCCH transmissions 220 may be received/decoded in contiguous slots 225, non-contiguous slots 225, or both. For example, the UE capability 210 may include an indication of a quantity of slots 225 (e.g., maximum quantity) between a first PDCCH transmission 220 and a second PDCCH transmission 220 associated with (e.g., related/linked to) the first PDCCH transmission 220 that are capable of being decoded by the UE 115-a.

For instance, if the UE capability 210 indicates that a maximum quantity of slots 225 between linked PDCCH transmissions 220 is one, this may indicate that the UE 115-a supports inter-slot PDCCH repetitions only in contiguous (e.g., adjacent) slots 225, whereas quantities of slots 225 between linked transmissions greater than one may indicate that the UE 115-a may support non-contiguous inter-slot PDCCH repetitions, contiguous inter-slot PDCCH repetitions, or both. In particular, if the UE capability 210 indicates that a maximum quantity of slots between linked PDCCH transmissions 220 is M, this may indicate that the UE 115-a may support inter-slot PDCCH repetition for $(o_{s,2}-o_{s,1}) \mod k_s \leq M$, where $k_s$ is the periodicity of a first and second linked search space set, $o_{s,1}$ is the slot offset of the first search space set among the two linked search space sets, and $o_{s,2}$ is the slot offset of the second search space set among the two linked search space sets.

Furthermore, in cases where the UE capability 210 indicates that the UE 115-a supports receipt of inter-slot control channel repetitions (e.g., UE 115-a supports the third configuration 215-c for inter-slot PDCCH repetitions), the UE capability 210 may additionally indicate a quantity (e.g., maximum quantity) of slots 225 in which a search space set exists within a search space set periodicity, where the search space set is linked with another search space set for inter-slot PDCCH repetition. In other words, the UE capability 210 may indicate a maximum search space set duration for sets of related search space sets which are linked for inter-slot PDCCH repetition. For example, the UE capability 210 may include an indication of a maximum number of slots 225 across which the UE 115-a supports one or more linked search space sets for inter-slot PDCCH repetitions in accordance with a search space set periodicity for the one or more linked search space sets.

Moreover, the UE capability 210 may indicate whether the UE 115-a may receive and/or decode PDCCH transmissions 220 which are received in overlapping search space sets. In particular, the UE capability 210 may indicate whether the UE 115-a may receive and/or decode PDCCH transmissions 220 which are received in monitoring occasions of one or more search space sets which overlap in the time domain, frequency domain, or both. For example, the UE capability 210 may indicate that the UE 115-a supports receipt of PDCCH transmissions 220 which are received within a first monitoring occasion of a first search space set, a second monitoring occasion of a second search space set, or both, where the first and second monitoring occasions at least partially overlap in the time domain, the frequency domain, or both. In some aspects, an ability of the UE 115-a to monitor search space sets/monitoring occasions which overlap in the time domain may enable the base station 105-a to determine applicable (e.g., allowable) values of the RRC parameter monitoringSymbolsWithinSlot for linked search space sets. Similarly, an ability of the UE 115-a to monitor search space sets/monitoring occasions which overlap in the frequency domain may enable the base station 105-a to determine applicable (e.g., allowable) configurations for two linked CORESETs which are associated with two linked search space sets for intra-slot PDCCH repetitions.

In some aspects, the various capabilities of the UE 115-a and/or parameters of the configurations supported by the UE 115-a may be indicated via the UE capability 210 at varying granularities. For example, the various capabilities of the UE 115-a and/or parameters of the configurations supported by the UE 115-a may be indicated for the UE 115-a (e.g., indicated on a per-UE 115 basis), may be indicated for each frequency band of the UE 115-a (e.g., indicated on a per-band basis), may be indicated for each frequency band combination of the UE 115-a (e.g., indicated on a per-band combination basis), may be indicated for each band of band combinations (e.g., on a per-feature set (FS) basis), may be indicated for each component carrier of a band of a band combination (e.g., indicated on a per-feature set per component carrier (FSPC) basis), or any combination thereof.

In some aspects, the UE 115-a may receive, from the base station 105-a, a configuration 215 for receiving multiple related downlink control channel transmissions. In this regard, the UE 115-a may receive an indication of the first configuration 215-a for SFN PDCCH transmissions 220, the second configuration 215-b for intra-slot PDCCH repetitions, the third configuration 215-c for inter-slot PDCCH repetitions, or any combination thereof. The configuration 215 may be indicated via control signaling, including RRC messages, DCI messages, MAC-CE messages, and the like.

In some aspects, the UE 115-a may receive the configuration 215 based on transmitting the UE capability 210. In particular, the configuration 215 may be based on the one or more parameters or characteristics of the UE 115-a which were indicated via the UE capability 210. Accordingly, the base station 105-a may configure the UE 115-a for SFN PDCCH transmissions 220, intra-slot PDCCH repetitions, and/or inter-slot PDCCH repetitions (via the configuration 215) in accordance with the various capabilities or limitations of the UE 115-a which were indicated in the UE capability 210. In other words, the base station 105-a may configure the UE 115-a with the configuration 215 for receiving multiple related PDCCH transmissions 220 which instructs the UE 115-a to monitor sets of resources, sets of related CORESETs, sets of related search space sets, sets of related monitoring occasions, or any combination thereof, for SFN PDCCH transmissions 220, intra-slot PDCCH repetitions, inter-slot PDCCH repetitions, or any combination thereof.

For example, the configuration 215 may be based on any parameters or characteristics indicated in the UE capability 210 including, but not limited to, an ability to receive multiple related PDCCH transmissions 220 which are associated with three or more CORESETs that are associated with a common BWP, a quantity (e.g., maximum quantity) of slots between related PDCCH transmissions 220 that which are capable of being decoded by the UE 115-a, an ability to receive/decode related PDCCH transmissions 220 within overlapping search space sets and/or overlapping monitoring occasions, a quantity of PDCCH monitoring occasions within one or more slots that are monitored by the UE 115-a, an ability of the UE 115-a to monitor UE-specific and/or common search space sets, a format for PDCCH transmissions 220 (e.g., DCI format), parameters associated with CORESETs for intra-slot and/or inter-slot PDCCH repetitions, an ability of the UE 115-*a* to perform span-based monitoring, a quantity of CORESETs within a BWP, or any combination thereof.

For instance, in some cases, the UE capability 210 may indicate that the UE 115-*a* supports span-based monitoring. In such cases, the UE capability 210 may indicate that the UE 115-*a* supports monitoring of a quantity of control channel candidates per span of resources, a quantity of CCEs per span of resources, or both. In this example, the UE 115-*a* may receive the configuration 215 based on the quantities of control channel candidates and/or CCEs which may be monitored per span of resources, as indicated in the UE capability 210.

In some aspects, the UE 115-*a* may receive an indication of one or more CORESETs 230 for receiving multiple related PDCCH transmissions 220. The one or more CORESETs 230 may be indicated via control signaling, including RRC messages, DCI messages, MAC-CE messages, and the like. In some aspects, the UE 115-*a* may receive the indication of the one or more CORESETs 230 based on transmitting the UE capability 210, receiving the configuration 215, or both. Additionally, or alternatively, the indication of the one or more CORESETs 230 may be indicated along with the configuration 215. In this regard, in some implementations, the configuration 215 and the CORESETs 230 may be indicated via a common control message (e.g., common RRC message, common DCI message).

In some aspects, the CORESETs 230 may be based on the one or more parameters or characteristics of the UE 115-*a* which were indicated via the UE capability 210. Accordingly, the base station 105-*a* may configure the UE 115-*a* with one or more CORESETs 230 in accordance with the various capabilities or limitations of the UE 115-*a* which were indicated in the UE capability 210. For example, the UE capability 210 may indicate whether the UE 115-*a* may support monitoring of two linked (e.g., related) CORESETs 230 in cases where the two linked CORESETs 230 have the same duration (e.g., same CORESET duration), different durations, or both. In such cases, the base station 105*a* may configure the UE 115-*a* with a first CORESET 230 and a second CORESET 230 based on (e.g., in accordance with) the indication that CORESET durations of linked CORESETs 230 may be the same, different, or both. For instance, the UE capability 210 may indicate that the UE 115-*a* may receive intra-slot and/or inter-slot PDCCH repetitions associated with two linked CORESETs 230 which have different CORESET durations. In this example, the UE 115-*a* may receive an indication of a first CORESET 230 having a first CORESET duration (e.g., two symbols), and a second CORESET 230 having a second CORESET duration (e.g., three symbols), where the first CORESET 230 and the second CORESET 230 are linked for inter-slot and/or intra-slot PDCCH repetitions.

Similarly, the UE 115-*a* may receive an indication of one or more related search space sets 235. The one or more related search space sets 235 may be indicated via control signaling, including RRC messages, DCI messages, MAC-CE messages, and the like. For example, the UE 115-*a* may receive an indication of a first search space set 235 and a second search space set 235, where the first search space set 235 is related to (e.g., linked with) the second search space set 235. In some aspects, the UE 115-*a* may receive the indication of the one or more search space sets 235 based on transmitting the UE capability 210, receiving the configuration 215, receiving the CORESETs 230, or any combination thereof. Additionally, or alternatively, the indication of the one or more search space sets 235 may be indicated along with the configuration 215, the CORESETs 230, or both. In this regard, in some implementations, the configuration 215, the CORESETs 230, and the search space sets 235 may be indicated via a common control message (e.g., common RRC message, common DCI message).

In some implementations, the one or more search space sets 235 may be based on the one or more parameters or characteristics of the UE 115-*a* which were indicated via the UE capability 210. Accordingly, the base station 105-*a* may configure the UE 115-*a* for with one or more search space sets 235 in accordance with the various capabilities or limitations of the UE 115-*a* which were indicated in the UE capability 210. For example, in cases where the UE capability 210 indicates that the UE 115-*a* supports receipt of inter-slot PDCCH repetitions, the base station 105-*a* may transmit an indication of a first search space set 235 and a second search space set 235 associated with the first search space set 235. In this example, the first and second search space sets 235 may each include one or more monitoring occasions in different slots 225 for inter-PDCCH repetition. For instance, the first search space set 235 may include a first monitoring occasion in a first slot 225-*a*, and the second search space set 235 may include a second monitoring occasion in a different slot 225 (e.g., second slot 225-*b*, third slot 225-*c*), where the first and second monitoring occasions 235 are related or linked for inter-PDCCH repetitions.

By way of another example, the UE capability 210 may include indication of a quantity of slots 225 between a first PDCCH transmission 220 and a second PDCCH transmission 220 associated with the first PDCCH transmission 220 that are capable of being decoded by the UE 115-*a*. For instance, the UE capability 210 may indicate that the UE 115-*a* may decode related PDCCH repetitions with up to three slots 225 between the related PDCCH repetitions for inter-slot PDCCH repetitions. In this example, the base station 105-*a* may configure the UE 115-*a* with a first search space set 235 and a second search space set 235 associated with the first search space set 235 in accordance with the indication of the quantity of slots 225. In particular, in cases where the UE 115-*a* indicates a maximum quantity of M slots 225 between related PDCCH transmissions 220 which may be decoded by the UE 115-*a*, the base station 105-*a* may configure the first and second search space sets 235 such that the monitoring occasions associated with the respective search space sets 235 are separated by no more than M slots 225.

By way of another example, in cases where the UE capability 210 indicates that the UE 115-*a* supports receipt of intra-slot PDCCH repetitions (e.g., indicates support for the second configuration 215-*b*), the base station 105-*a* may transmit an indication of a first search space set 235 and a second search space set 235 associated with the first search space set 235. In this example, the first and second search space sets 235 may each include one or more monitoring occasions in a common slot 225 for inter-PDCCH repetition. For instance, the first search space set 235 may include a first monitoring occasion in a first slot 225-*a*, and the second search space set 235 may include a second monitoring occasion in the first slot 225-*a*, where the first and second monitoring occasions are related or linked for intra-PDCCH repetitions. In some aspects, sets of related or linked search space 235 sets and/or monitoring occasions for intra-slot PDCCH repetition may at least partially overlap in the time domain, the frequency domain, or both. In such cases, the base station 105-*a* may configure the UE 115-*a* with sets of overlapping search space sets 235 and/or overlapping monitoring occasions based on an indication, in the UE capability 210, that the UE 115-a supports receipt of PDCCH transmissions 220 which are received in overlapping search space sets 235 and/or monitoring occasions.

In additional or alternative cases, the UE 115-a may receive the indication of the one or more search space sets 235 based on one or more additional parameters or characteristics indicated in the UE capability 210, including a quantity of PDCCH monitoring occasions which may be monitored by the UE 115-a, an indication that the UE 115-a supports monitoring of UE-specific search space sets 235 and/or common search space sets 235, a DCI format associated with intra-slot and/or inter-slot PDCCH repetitions, or any combination thereof.

In some aspects, the UE 115-a may monitor a downlink control channel (e.g., PDCCH) in accordance with the configuration 215 for receiving multiple related downlink control channel transmissions. Moreover, the UE 115-a may monitor the control channel based on transmitting the UE capability 210, receiving the configuration 215, receiving the CORESETs 230, receiving the search space sets 235, or any combination thereof.

For example, in cases where the UE 115-a is configured with a first search space set 235 including a first monitoring occasion in a first slot 225-a and a second search space set 235 including a second monitoring occasion in a third slot 225-c for inter-slot PDCCH repetitions, the UE 115-a may monitor the first search space set 235 (e.g., first monitoring occasion), the second search space set (e.g., second monitoring occasion), or both, for inter-slot PDCCH repetitions in accordance with the configuration 215 and the search space sets 235. Similarly, by way of another example, in cases where the UE 115-a is configured with a first search space set 235 including a first monitoring occasion in a first slot 225-a and a second search space set 235 including a second monitoring occasion in the first slot 225-a for intra-slot PDCCH repetitions, the UE 115-a may monitor the first search space set 235 (e.g., first monitoring occasion), the second search space set 235 (e.g., second monitoring occasion), or both, for intra-slot PDCCH repetitions in accordance with the configuration 215 and the search space sets 235.

By way of another example, in cases where the UE capability 210 indicates that the UE 115-a supports receipt of SFN PDCCH transmissions 220, the base station 105-a may configure the UE 115-a with a CORESET 230 including two TCI states at 315. In this example, the UE 115-a may monitor the control channel (e.g., PDCCH) for SFN downlink control channel transmissions based on (e.g., in accordance with) the indication of the CORESET 230.

In some aspects, the UE 115-a may receive, from the base station 105-a, a first downlink control channel transmission (e.g., first PDCCH transmission 220-a). In some aspects, the base station 105-a may transmit the first PDCCH transmission 220-a according to a 5G radio access technology, an NR radio access technology, or both. In some aspects, the UE 115-a may receive the first PDCCH transmission 220-a based on monitoring the downlink control channel (e.g., PDCCH). Moreover, the UE 115-a may receive (and the base station 105-a may transmit) the first PDCCH transmission 220-a based on transmitting/receiving the UE capability 210, transmitting/receiving the configuration 215, transmitting/receiving the CORESETs 230, transmitting/receiving the search space sets 235, monitoring the downlink control channel, or any combination thereof.

Similarly, in some implementations, the UE 115-a may receive, from the base station 105-a, a second downlink control channel transmission (e.g., second PDCCH transmission 220-b). In some aspects, the base station 105-a may transmit the second PDCCH transmission 220-b according to a 5G radio access technology, an NR radio access technology, or both. As noted previously herein, the second PDCCH transmission 220-b may be associated with (e.g., linked to, related with) the first PDCCH transmission 220-a. For example, the first PDCCH transmission 220-a and the second PDCCH transmission 220-b may include repetitions of the same PDCCH transmission 220, and may therefore include the same data payload.

In some aspects, the UE 115-a may receive the second PDCCH transmission 220-b based on monitoring the downlink control channel (e.g., PDCCH). Moreover, the UE 115-a may receive (and the base station 105-a may transmit) the second PDCCH transmission 220-b based on transmitting/receiving the UE capability 210, transmitting/receiving the configuration 215, transmitting/receiving the CORESETs 230, transmitting/receiving the search space sets 235, monitoring the downlink control channel, transmitting/receiving the first PDCCH transmission 220-a, or any combination thereof.

For example, in cases where the UE capability 210 indicates that the first UE 115-a supports SFN PDCCH transmissions 220 (e.g., supports the first configuration 215-a), the UE 115-a may receive a configuration 215 for SFN PDCCH transmissions 220. In this example, the UE 115-a may receive a first SFN PDCCH transmission 220-a, and a second SFN PDCCH transmission 220-b, in accordance with the configuration 215 for SFN PDCCH transmissions. By way of another example, in cases where the UE 115-a is configured for intra-slot PDCCH repetitions, the UE 115-a may receive a first PDCCH transmission 220-a within a first slot 225-a, and may receive a second PDCCH transmission 220-b associated with (e.g., linked to, related with) the first PDCCH transmission 220-a within the same slot 225 (e.g., first slot 225-a). Similarly, in cases where the UE 115-a is configured for inter-slot PDCCH repetitions, the UE 115-a may receive a first PDCCH transmission 220-a within a first slot 225-a, and may receive a second PDCCH transmission 220-b associated with (e.g., linked to, related with) the first PDCCH transmission 220-b within a third slot 225-c which is different from the first slot 225-a.

In some aspects, UE 115-a may decode the first PDCCH transmission 220-a, the second PDCCH transmission 220-b, or both. In some aspects, the UE 115-a may decode the first PDCCH transmission 220-a and/or the second PDCCH transmission 220-b based on receiving the respective PDCCH transmissions 220. Moreover, the UE 115-a may decode the first PDCCH transmission 220-a and/or the second PDCCH transmission 220-b based on transmitting the UE capability 210, receiving the configuration 215, receiving the CORESETs 230, receiving the search space sets 235, monitoring the downlink control channel, receiving the first PDCCH transmission 220-a, receiving the second PDCCH transmission 220-b, or any combination thereof.

For example, as noted previously herein, the first PDCCH transmission 220-a and the second PDCCH transmission 220-b may include repetitions of the same PDCCH transmission 220, and may therefore include the same data payload. In this regard, the UE 115-a may be configured to decode (e.g., demodulate) the data payload of the respective PDCCH transmissions 220 by decoding the first PDCCH transmission 220-a or the second PDCCH transmission 220-b. Additionally or alternatively, the UE 115-a may decode the data payload of the respective PDCCH transmissions 220 by performing a soft-combining procedure with both the first PDCCH transmission 220-*a* and the second PDCCH transmission 220-*b*.

Techniques described herein may provide for improved scheduling of wireless communications. In particular, by enabling the UE 115-*a* to inform the network (e.g., base station 105-*a*) its capability to support one or more configurations for PDCCH repetition (e.g., SFN PDCCH transmissions 220, inter-slot PDCCH repetitions, intra-slot PDCCH repetitions), techniques described herein may enable the base station 105-*a* to communicate with the UE 115-*a* using the respective configurations for PDCCH repetitions depending on the characteristics of the network (e.g., quantity of data traffic, noise) as well as the capabilities of the UE 115-*a*. Thus, techniques described herein may enable more widespread use of communications using PDCCH repetitions within the wireless communications system, thereby improving a reliability of wireless communications, improving transmission diversity, and further protecting wireless communications against interference.

Figure 3:
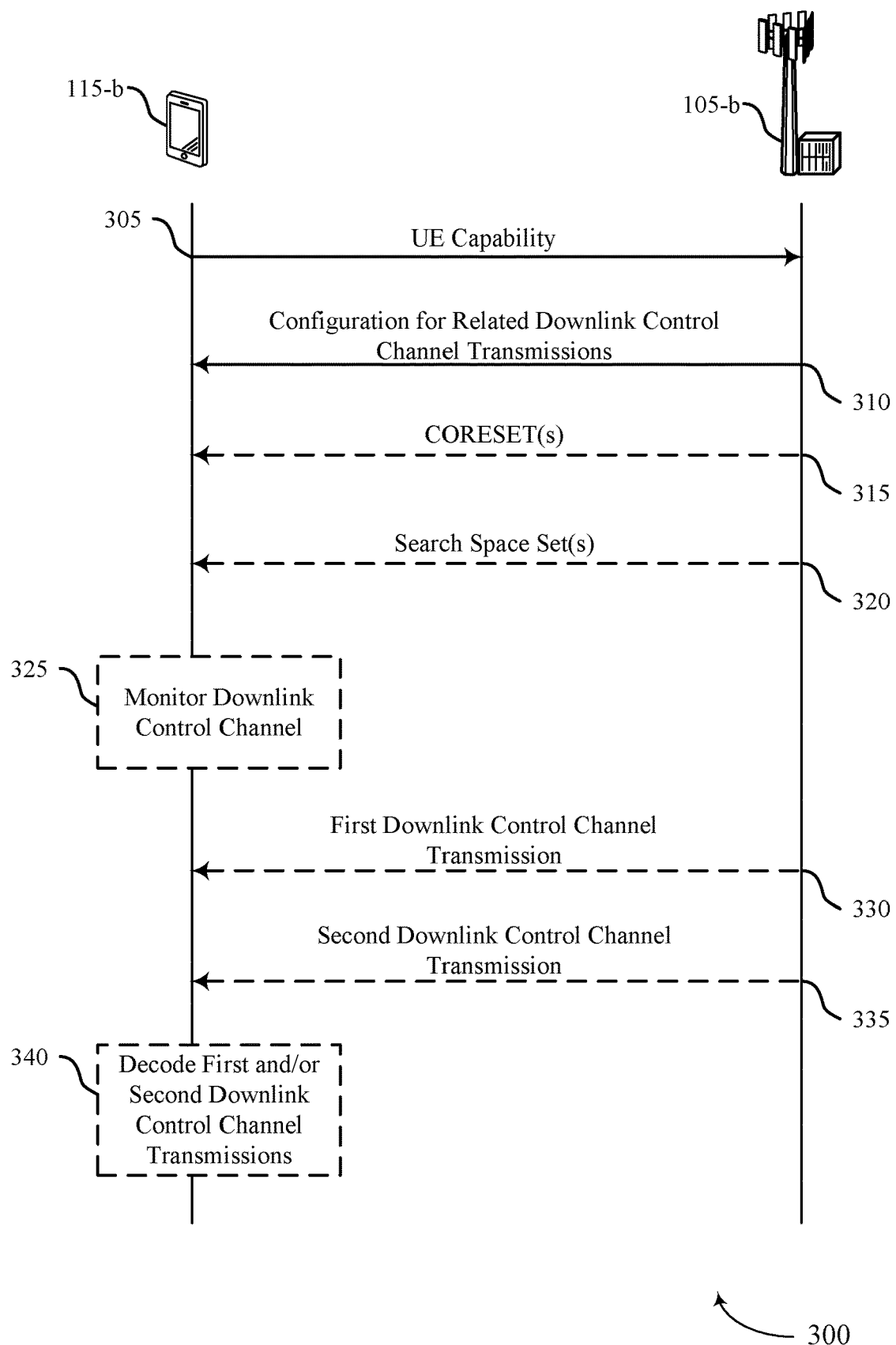
FIG. 3 illustrates an example of a process flow that supports techniques for signaling user equipment capability for PDCCH repetition in accordance with aspects of the present disclosure.

FIG. 3 illustrates an example of a process flow 300 that supports techniques for signaling user equipment capability for PDCCH repetition in accordance with aspects of the present disclosure. In some examples, process flow 300 may implement, or be implemented by, aspects of wireless communications systems 100, wireless communications system 200, or both. For example, the process flow 300 may illustrate a UE 115-*b* transmitting a UE capability to support receipt of multiple related downlink control channel transmissions, receiving a configuration for receiving multiple related downlink channel transmissions, and monitoring a downlink control channel in accordance with the configuration, as described with reference to FIGS. 1-2.

In some cases, process flow 300 may include a UE 115-*a*, and a base station 105-*b*, which may be examples of corresponding devices as described herein. In particular, the UE 115-*b* and the base station 105-*b* illustrated in FIG. 3 may include examples of the UE 115-*a* and the base station 105-*a* illustrated in FIG. 2.

In some examples, the operations illustrated in process flow 300 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-*b* may transmit a UE capability indicating that the UE 115-*b* supports receipt of multiple related downlink control channel transmissions (e.g., multiple related PDCCH transmissions) which are associated with one or more CORESETs. In some aspects, the UE capability may be indicated via a UE capability report. In some aspects, the UE capability may indicate that it can receive and/or SFN downlink control channel transmissions (e.g., SFN PDCCH transmissions), intra-slot downlink control channel repetitions (e.g., intra-slot PDCCH repetitions), inter-slot downlink control channel repetitions (e.g., inter-slot PDCCH repetitions), or any combination thereof. In this regard, the UE capability may indicate that the UE 115-*b* supports a first configuration for receiving/decoding SFN PDCCH transmissions, a second configuration for receiving/decoding intra-slot PDCCH repetitions, and/or a third configuration for receiving/decoding inter-slot PDCCH repetitions.

In some cases, a network (e.g., wireless communications system 100, 200) may be configured with one or more standardized configurations for receiving/decoding multiple related downlink control channel transmissions. In such cases, the UE capability may indicate that the UE 115-*b* supports one or more of the configurations for receiving/decoding multiple related PDCCH transmissions via one or more bit field values of a UE capability report.

In some aspects, the UE capability may indicate that the UE supports receipt of SFN downlink control channel transmissions. In other words, the UE capability may indicate that the UE 115*b* supports a first configuration for SFN PDCCH transmissions. As noted previously herein, in the context of SFN, each PDCCH transmission (e.g., PDCCH DMRS) may be associated with two TCI states. In such cases, the UE capability may include an indication of a quantity of CORESETs within a BWP which may be configured at the UE 115*b*. In particular, the UE capability may include an indication of a quantity of CORESETs within a BWP which may simultaneously be associated with two active TCI states.

In some cases, the UE capability may indicate that the UE supports receipt of inter-slot downlink control channel transmissions, intra-slot downlink control channel transmissions, or both. In other words, the UE capability may indicate that the UE 115-*b* supports a second configuration for intra-slot PDCCH repetitions, a third configuration for intra-slot PDCCH repetitions, or both. In such cases, the UE capability may include one or more parameters associated with intra-slot and/or inter-slot PDCCH repetitions which may be received/decoded by the UE 115-*b* including, but not limited to, quantities (e.g., maximum quantity) of downlink control channel monitoring occasions (e.g., PDCCH monitoring occasions) within one or more slots which may be monitored by the UE 115-*b*, indications that the UE 115-*b* does or does not support monitoring of UE-specific search space sets and/or common search space sets, a format (e.g., DCI formats including DCI 1_0, DCI 2_0, DCI 3_0, etc.) for downlink control information associated with intra-slot and/or inter-slot downlink control channel repetitions, or any combination thereof.

For example, the UE capability may indicate a maximum number of PDCCH monitoring occasions within a slot which can be configured for a search space set that is linked with another search space set for inter-slot and/or intra-slot PDCCH repetitions. The indication of a maximum number of PDCCH monitoring occasions which may be monitored by the UE 115-*b* may determine allowable values of RRC parameters (e.g., monitoringSymbolsWithinSlot) which the base station 105-*b* may configure for the related/linked search space sets. By way of another example, the UE capability may indicate that the UE 115-*b* may receive and/or decode UE-specific search space sets and/or common search space sets for inter-slot PDCCH repetition, intra-slot PDCCH repetition, or both. By way of another example, the UE capability may indicate which DCI formats the UE 115-*b* may receive/decode for inter-slot and/or intra-slot PDCCH repetitions. In some aspects, the indication of the DCI format may determine allowable values for of RRC parameters (e.g., searchSpaceType) which the base station 105-*b* may configure for the related/linked search space sets.

The UE capability may indicate one or more parameters associated with sets of CORESETs which are linked for inter-slot and/or intra-slot PDCCH repetition. For example, the UE capability may indicate that the UE 115-*b* supports receipt of a first PDCCH transmission associated with a first CORESET, and a second PDCCH transmission associated with a second CORESET, where the first and second PDCCH transmissions are related or linked. In this example, the UE capability may indicate a first set of parameters associate with the first CORESET, and a second set of parameters associated with the second CORESET. In some cases, the first and second sets of parameters may be the same or different. The parameters associated with the respective CORESETs may include, but are not limited to, CORESET durations, CCE-REG mapping types, precoding granularity, CORESET pool indexes, or any combination thereof.

Additionally, or alternatively, in cases where the UE capability indicates that the UE 115-*b* supports inter-slot and/or intra-slot PDCCH repetition, the UE capability may additionally indicate whether the UE 115-*b* supports more than three CORESETs within an active BWP of a serving cell (and/or component carrier). For example, the UE capability may indicate that the UE 115-*b* supports receipt of multiple related downlink control channel transmissions which are associated with three or more CORESETs, where the three or more CORESETs are associated with a common BWP.

Furthermore, in cases where the UE capability indicates that the UE 115-*b* supports inter-slot and/or intra-slot PDCCH repetition, the UE capability may additionally indicate whether the UE 115-*b* supports span-based PDCCH monitoring within a serving cell configured for inter-slot and/or intra-slot PDCCH repetition. In particular, the UE capability may indicate a maximum quantity of control channel candidates and/or CCEs (e.g., non-overlapping CCEs) per span of resources (e.g., span of time resources, span of frequency resources) which may be monitored or blindly decoded. For example, the UE capability may indicate that the UE 115-*b* supports monitoring of a quantity of control channel candidates per span of resources, a quantity of CCEs per span of resources, or both. In such cases, the UE capability may indicate whether PDCCH repetitions may be monitored/decoded within a same span of resources, within different spans of resources, or both.

As noted previously herein, the UE 115-*b* may be able to decode multiple repetitions of related PDCCH transmissions (e.g., first repetition of DCI, second repetition of DCI) by performing soft combining of the respective PDCCH transmissions. As such, by supporting inter-slot and/or intra-slot PDCCH repetitions, the UE 115-*b* may be configured to store a soft output of a PDCCH candidate/repetition for a certain amount of time in order to combine the soft output with a later-received PDCCH candidate/repetition. The ability to store soft outputs of PDCCH repetitions may be particularly important in the context of inter-slot PDCCH repetitions, in which the related/linked PDCCH repetitions are located in different slots. For instance, the UE 115-*b* may only have the storage capacity and/or processing capability to store a soft output of a first repetition of a PDCCH transmission for three slots, and may therefore be unable to receive inter-slot PDCCH repetitions where the repetitions are separated by more than three slots.

Accordingly, in cases where the UE capability indicates that the UE supports receipt of inter-slot control channel repetitions (e.g., UE 115-*b* supports the second configuration for inter-slot PDCCH repetitions), the UE capability may additionally indicate a quantity of slots between linked/related downlink control channel transmissions which are capable of being blindly decoded. In particular, the UE capability may indicate whether repetitions of PDCCH transmissions may be received/decoded in contiguous slots, non-contiguous slots, or both. For example, the UE capability may include an indication of a quantity of slots (e.g., maximum quantity) between a first PDCCH transmission and a second PDCCH transmission associated with (e.g., related/linked to) the first PDCCH transmission that are capable of being decoded by the UE 115-*b*. For instance, if the UE capability indicates that a maximum quantity of slots between linked PDCCH transmissions is one, this may indicate that the UE 115-*b* supports inter-slot PDCCH repetitions only in contiguous slots, whereas quantities of slots between linked transmissions greater than one may indicate that the UE 115-*b* may support non-contiguous inter-slot PDCCH repetitions, contiguous inter-slot PDCCH repetitions, or both.

Furthermore, in cases where the UE capability indicates that the UE 115-*b* supports receipt of inter-slot control channel repetitions (e.g., UE 115-*b* supports the third configuration for inter-slot PDCCH repetitions), the UE capability may additionally indicate a quantity (e.g., maximum quantity) of slots in which a search space set exists within a search space set periodicity, where the search space set is linked with another search space set for inter-slot PDCCH repetition. In other words, the UE capability may indicate a maximum search space set duration for sets of related search space sets which are linked for inter-slot PDCCH repetition. For example, the UE capability may include an indication of a maximum number of slots across which the UE 115-*b* supports one or more linked search space sets for inter-slot PDCCH repetitions in accordance with a search space set periodicity for the one or more linked search space sets.

Moreover, the UE capability may indicate whether the UE 115-*b* may receive and/or decode PDCCH transmissions which are received in overlapping search space sets. In particular, the UE capability may indicate whether the UE 115-*b* may receive and/or decode PDCCH transmissions which are received in monitoring occasions of one or more search space sets which overlap in the time domain, frequency domain, or both. For example, the UE capability may indicate that the UE 115-*b* supports receipt of PDCCH transmissions which are received within a first monitoring occasion of a first search space set, a second monitoring occasion of a second search space set, or both, where the first and second monitoring occasions at least partially overlap in the time domain, the frequency domain, or both.

In some aspects, the various capabilities of the UE 115-*b* and/or parameters of the configurations supported by the UE 115-*b* may be indicated via the UE capability at varying granularities. For example, the various capabilities of the UE 115-*b* and/or parameters of the configurations supported by the UE 115-*b* may be indicated for the UE 115-*b* (e.g., indicated on a per-UE 115 basis), may be indicated for each frequency band of the UE 115-*b* (e.g., indicated on a per-band basis), may be indicated for each frequency band combination of the UE 115-*b* (e.g., indicated on a per-band combination basis), may be indicated for each band of band combinations (e.g., on a per-FS basis), may be indicated for each component carrier of a band of a band combination (e.g., indicated on a per-FSPC basis), or any combination thereof.

At 310, the UE 115-*b* may receive, from the base station 105-*b*, a configuration for receiving multiple related downlink control channel transmissions. In this regard, the UE 115-*b* may receive an indication of a first configuration for SFN PDCCH transmissions, a second configuration for intra-slot PDCCH repetitions, a third configuration for inter-slot PDCCH repetitions, or any combination thereof. The configuration transmitted at 310 may be indicated via control signaling, including RRC messages, DCI messages, MAC-CE messages, and the like.

In some aspects, the UE 115-*b* may receive the configuration at 310 based on transmitting the UE capability at 305. In particular, the configuration received at 310 may be based on the one or more parameters or characteristics of the UE 115-*b* which were indicated via the UE capability at 305. Accordingly, the base station 105-*b* may configure the UE 115-*b* for SFN PDCCH transmissions, intra-slot PDCCH repetitions, and/or inter-slot PDCCH repetitions in accordance with the various capabilities or limitations of the UE 115-*b* which were indicated in the UE capability. In other words, the base station 105-*b* may configure the UE 115-*b* with the configuration for receiving multiple related PDCCH transmissions which instructs the UE 115-*b* to monitor sets of resources, sets of related CORESETs, sets of related search space sets, sets of related monitoring occasions, or any combination thereof, for SFN PDCCH transmissions, intra-slot PDCCH repetitions, inter-slot PDCCH repetitions, or any combination thereof.

For example, the configuration received at 310 may be based on any parameters or characteristics indicated in the UE capability including, but not limited to, an ability to receive multiple related PDCCH transmissions which are associated with three or more CORESETs that are associated with a common BWP, a quantity (e.g., maximum quantity) of slots between related PDCCH transmissions that which are capable of being decoded by the UE 115-*b*, an ability to receive/decode related PDCCH transmissions within overlapping search space sets and/or monitoring occasions, a quantity of PDCCH monitoring occasions within one or more slots that are monitored by the UE 115-*b*, an ability of the UE 115-*b* to monitor UE-specific and/or common search space sets, a format for PDCCH transmissions, parameters associated with CORESETs for intra-slot and/or inter-slot PDCCH repetitions, an ability of the UE 115-*b* to perform span-based monitoring, a quantity of CORESETs within a BWP, or any combination thereof.

For instance, in some cases, the UE capability may indicate that the UE 115-*b* supports span-based monitoring. In such cases, the UE capability may indicate that the UE 115-*b* supports monitoring of a quantity of control channel candidates per span of resources, a quantity of CCEs per span of resources, or both. In this example, the UE 115-*b* may receive the configuration based on the quantities of control channel candidates and/or CCEs which may be monitored per span of resources, as indicated in the UE capability.

At 315, the UE 115-*b* may receive an indication of one or more CORESETs for receiving multiple related PDCCH transmissions. The one or more CORESETs may be indicated via control signaling, including RRC messages, DCI messages, MAC-CE messages, and the like.

In some aspects, the UE 115-*b* may receive the indication of the one or more CORESETs based on transmitting the UE capability at 305, receiving the configuration at 310, or both. Additionally, or alternatively, the indication of the one or more CORESETs indicated at 315 may be indicated along with the configuration at 310. In this regard, in some implementations, the configuration at 310 and the CORESETs at 315 may be indicated via a common control message.

In some aspects, the CORESET received at 315 may be based on the one or more parameters or characteristics of the UE 115-*b* which were indicated via the UE capability at 305. Accordingly, the base station 105-*b* may configure the UE 115-*b* with one or more CORESETs at 315 in accordance with the various capabilities or limitations of the UE 115-*b* which were indicated in the UE capability. For example, the UE capability may indicate whether the UE 115-*b* may support monitoring of two linked (e.g., related) CORESETs in cases where the two linked CORESETs have the same duration (e.g., same CORESET duration), different durations, or both. In such cases, the base station 105-*b* may configure the UE 115-*b* with a first CORESET and a second CORESET at 315 based on (e.g., in accordance with) the indication that CORESET durations of linked CORESETs may be the same, different, or both. For instance, the UE capability may indicate that the UE 115-*b* may receive intra-slot and/or inter-slot PDCCH repetitions associated with two linked CORESETs which have different CORESET durations. In this example, the UE 115-*b* may receive an indication of a first CORESET having a first CORESET duration (e.g., two symbols), and a second CORESET having a second CORESET duration (e.g., three symbols), where the first CORESET and the second CORESET are linked for inter-slot and/or intra-slot PDCCH repetitions.

At 320, the UE 115-*b* may receive an indication of one or more related search space sets. The one or more related search space sets may be indicated via control signaling, including RRC messages, DCI messages, MAC-CE messages, and the like. For example, the UE 115-*b* may receive an indication of a first search space set and a second search space set, where the first search space set is related to (e.g., linked with) the second search space set. In some aspects, the UE 115-*b* may receive the indication of the one or more search space sets based on transmitting the UE capability at 305, receiving the configuration at 310, receiving the CORESETs at 315, or any combination thereof. Additionally, or alternatively, the indication of the one or more search space sets indicated at 315 may be indicated along with the configuration at 310, the CORESETs at 315, or both. In this regard, in some implementations, the configuration at 310, the CORESETs at 315, and the search space sets at 320 may be indicated via a common control message.

In some aspects, the one or more search space sets received at 320 may be based on the one or more parameters or characteristics of the UE 115-*b* which were indicated via the UE capability at 305. Accordingly, the base station 105-*b* may configure the UE 115-*b* for with one or more search space sets at 320 in accordance with the various capabilities or limitations of the UE 115-*b* which were indicated in the UE capability. For example, in cases where the UE capability indicates that the UE 115-*b* supports receipt of inter-slot PDCCH repetitions, the base station 105-*b* may transmit an indication of a first search space set and a second search space set associated with the first search space set. In this example, the first and second search space sets may each include one or more monitoring occasions in different slots for inter-PDCCH repetition. For instance, the first search space set may include a first monitoring occasion in a first slot, and the second search space set may include a second monitoring occasion in a second slot, where the first and second monitoring occasions are related or linked for inter-PDCCH repetitions.

By way of another example, the UE capability transmitted at 305 may include indication of a quantity of slots between a first PDCCH transmission and a second PDCCH transmission associated with the first PDCCH transmission that are capable of being decoded by the UE 115-*b*. For instance, the UE capability may indicate that the UE 115-*b* may decode related PDCCH repetitions with up to three slots between the related PDCCH repetitions for inter-slot PDCCH repetitions. In this example, the base station 105-*b* may configure the UE 115-*b* with a first search space set and a second search space set associated with the first search space set in accordance with the indication of the quantity of slots. In particular, in cases where the UE 115-*b* indicates a maximum quantity of M slots between related PDCCH transmissions which may be decoded by the UE 115-*b*, the base station 105-*b* may configure the first and second search space sets such that the monitoring occasions associated with the respective search space sets are separated by no more than M slots.

By way of another example, in cases where the UE capability indicates that the UE 115-*b* supports receipt of intra-slot PDCCH repetitions, the base station 105-*b* may transmit an indication of a first search space set and a second search space set associated with the first search space set. In this example, the first and second search space sets may each include one or more monitoring occasions in a common slot for inter-PDCCH repetition. For instance, the first search space set may include a first monitoring occasion in a first slot, and the second search space set may include a second monitoring occasion in the first slot, where the first and second monitoring occasions are related or linked for intra-PDCCH repetitions. In some aspects, sets of related or linked search space sets and/or monitoring occasions for intra-slot PDCCH repetition may at least partially overlap in the time domain, the frequency domain, or both. In such cases, the base station 105-*b* may configure the UE 115-*b* with sets of overlapping search space sets and/or overlapping monitoring occasions based on an indication, in the UE capability, that the UE 115-*b* supports receipt of PDCCH transmissions which are received in overlapping search space sets and/or monitoring occasions.

In additional or alternative cases, the UE 115-*b* may receive the indication of the one or more search space sets at 320 based on one or more additional parameters or characteristics indicated in the UE capability, including a quantity of PDCCH monitoring occasions which may be monitored by the UE 115-*b*, an indication that the UE 115-*b* supports monitoring of UE-specific search space sets and/or common search space sets, a DCI format associated with intra-slot and/or inter-slot PDCCH repetitions, or any combination thereof.

At 325, the UE 115-*b* may monitor a downlink control channel (e.g., PDCCH) in accordance with the configuration received at 310. Moreover, the UE 115-*b* may monitor the control channel at 325 based on transmitting the UE capability at 305, receiving the configuration at 310, receiving the CORESETs at 315, receiving the search space sets at 320, or any combination thereof.

For example, in cases where the UE 115-*b* is configured with a first search space set including a first monitoring occasion in a first slot and a second search space set including a second monitoring occasion in a second slot for inter-slot PDCCH repetitions, the UE 115-*b* may monitor the first search space set (e.g., first monitoring occasion), the second search space set (e.g., second monitoring occasion), or both, for inter-slot PDCCH repetitions in accordance with the configuration received at 315 and the search space sets received at 320. Similarly, by way of another example, in cases where the UE 115-*b* is configured with a first search space set including a first monitoring occasion in a first slot and a second search space set including a second monitoring occasion in the first slot for intra-slot PDCCH repetitions, the UE 115-*b* may monitor the first search space set (e.g., first monitoring occasion), the second search space set (e.g., second monitoring occasion), or both, for intra-slot PDCCH repetitions in accordance with the configuration received at 315 and the search space sets received at 320.

By way of another example, in cases where the UE capability transmitted at 305 indicates that the UE 115-*b* supports receipt of SFN PDCCH transmissions, the base station 105-*b* may configure the UE 115-*b* with a CORESET including two TCI states at 315. In this example, the UE 115-*b* may monitor the control channel (e.g., PDCCH) at 325 for SFN downlink control channel transmissions based on (e.g., in accordance with) the indication of the CORESET at 315.

At 330, the UE 115-*b* may receive, from the base station 105-*b*, a first downlink control channel transmission (e.g., first PDCCH transmission). In some aspects, the base station 105-*b* may transmit the first PDCCH transmission at 330 according to a 5G radio access technology, an NR radio access technology, or both. In some aspects, the UE 115-*b* may receive the first PDCCH transmission at 330 based on monitoring the downlink control channel (e.g., PDCCH) at 325. Moreover, the UE 115-*b* may receive (and the base station 105-*b* may transmit) the first PDCCH transmission at 330 based on transmitting/receiving the UE capability at 305, transmitting/receiving the configuration at 310, transmitting/receiving the CORESETs at 315, transmitting/receiving the search space sets at 320, monitoring the downlink control channel at 325, or any combination thereof.

At 335, the UE 115-*b* may receive, from the base station 105-*b*, a second downlink control channel transmission (e.g., second PDCCH transmission). In some aspects, the base station 105-*b* may transmit the second PDCCH transmission at 335 according to a 5G radio access technology, an NR radio access technology, or both. As noted previously herein, the second PDCCH transmission may be associated with (e.g., linked to, related with) the first PDCCH transmission. For example, the first PDCCH transmission and the second PDCCH transmission may include repetitions of the same PDCCH transmission, and may therefore include the same data payload.

In some aspects, the UE 115-*b* may receive the second PDCCH transmission at 335 based on monitoring the downlink control channel (e.g., PDCCH) at 325. Moreover, the UE 115-*b* may receive (and the base station 105-*b* may transmit) the second PDCCH transmission at 335 based on transmitting/receiving the UE capability at 305, transmitting/receiving the configuration at 310, transmitting/receiving the CORESETs at 315, transmitting/receiving the search space sets at 320, monitoring the downlink control channel at 325, transmitting/receiving the first PDCCH transmission at 330, or any combination thereof.

For example, in cases where the UE capability indicates that the first UE 115-*b* supports SFN PDCCH transmissions, the UE 115-*b* may receive a configuration for SFN PDCCH transmissions at 310. In this example, the UE 115-*b* may receive a first SFN PDCCH transmission at 330, and a second SFN PDCCH transmission at 335, in accordance with the configuration received at 310. By way of another example, in cases where the UE 115-*b* is configured for intra-slot PDCCH repetitions, the UE 115-*b* may receive a first PDCCH transmission within a slot at 330, and may receive a second PDCCH transmission associated with (e.g., linked to, related with) the first PDCCH transmission within the same slot at 335. Similarly, in cases where the UE 115-*b* is configured for inter-slot PDCCH repetitions, the UE 115-*b* may receive a first PDCCH transmission within a first slot at 330, and may receive a second PDCCH transmission associated with (e.g., linked to, related with) the first PDCCH transmission within a second slot which is different from the first slot at 335.

At 340, the UE 115-*b* may decode the first PDCCH transmission, the second PDCCH transmission, or both. In some aspects, the UE 115-*b* may decode the first PDCCH transmission and/or the second PDCCH transmission at 340 based on receiving the respective PDCCH transmissions at 330 and/or 335. Moreover, the UE 115-*b* may decode the first PDCCH transmission and/or the second PDCCH transmission at 340 based on transmitting the UE capability at 305, receiving the configuration at 310, receiving the CORESETs at 315, receiving the search space sets at 320, monitoring the downlink control channel at 325, receiving the first PDCCH transmission at 330, receiving the second PDCCH transmission at 335, or any combination thereof.

For example, as noted previously herein, the first PDCCH transmission and the second PDCCH transmission may include repetitions of the same PDCCH transmission, and may therefore include the same data payload. In this regard, the UE 115-*b* may be configured to decode (e.g., demodulate) the data payload of the respective PDCCH transmissions by decoding the first PDCCH transmission or the second PDCCH transmission. Additionally, or alternatively, the UE 115-*b* may decode the data payload of the respective PDCCH transmissions by performing a soft-combining procedure with both the first PDCCH transmission and the second PDCCH transmission.

Techniques described herein may provide for improved scheduling of wireless communications. In particular, by enabling the UE 115-*b* to inform the network (e.g., base station 105-*b*) its capability to support one or more configurations for PDCCH repetition (e.g., SFN PDCCH transmissions, inter-slot PDCCH repetitions, intra-slot PDCCH repetitions), techniques described herein may enable the base station 105-*b* to communicate with the UE 115-*b* using the respective configurations for PDCCH repetitions depending on the characteristics of the network (e.g., quantity of data traffic, noise) as well as the capabilities of the UE 115-*b*. Thus, techniques described herein may enable more widespread use of communications using PDCCH repetitions within the wireless communications system, thereby improving a reliability of wireless communications, improving transmission diversity, and further protecting wireless communications against interference.

Figure 4:
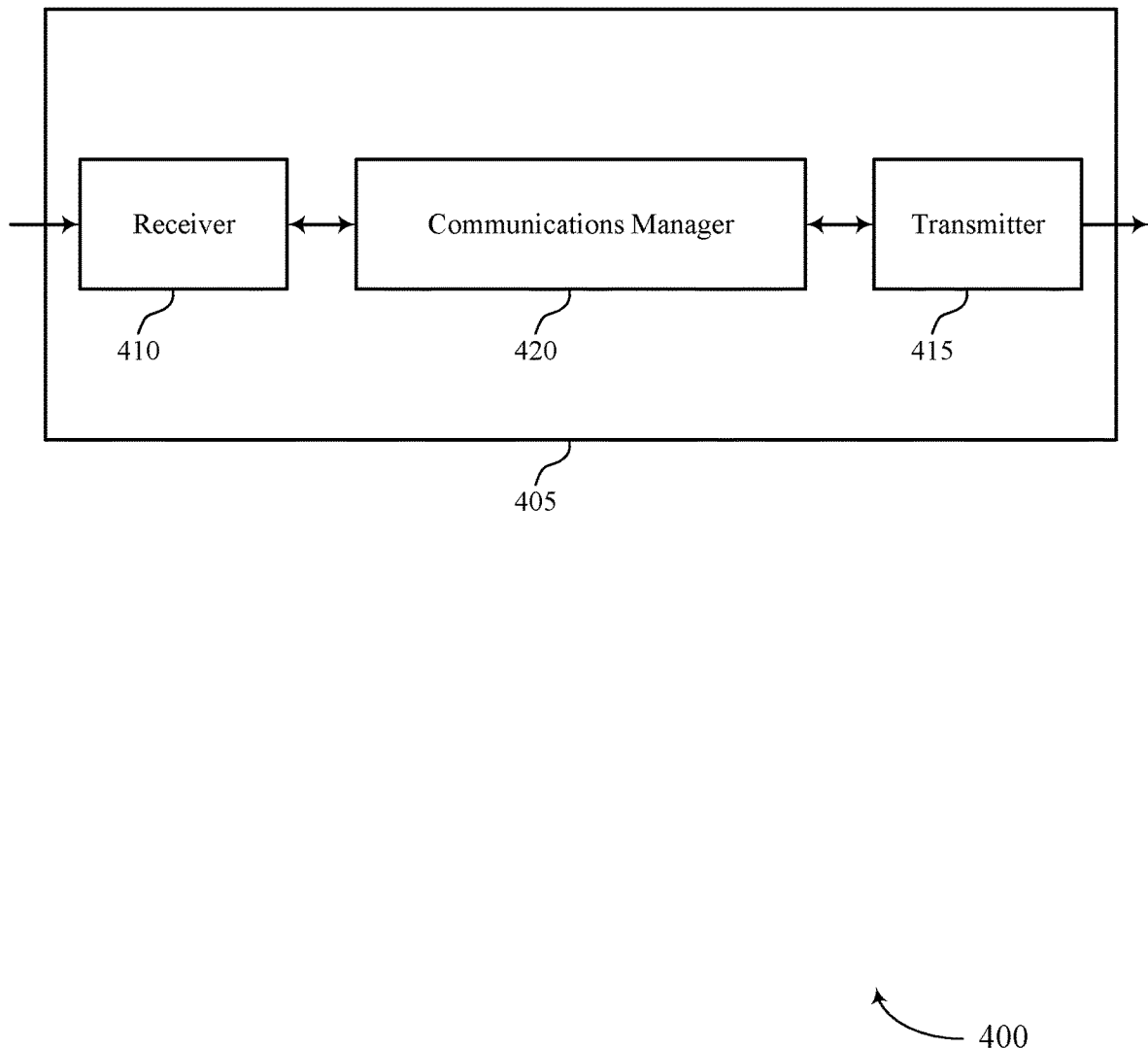
FIGS. 4 and 5 show block diagrams of devices that support techniques for signaling user equipment capability for PDCCH repetition in accordance with aspects of the present disclosure.

FIG. 4 shows a block diagram 400 of a device 405 that supports techniques for signaling user equipment capability for PDCCH repetition in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for signaling user equipment capability for PDCCH repetition). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for signaling user equipment capability for PDCCH repetition). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for signaling user equipment capability for PDCCH repetition as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software) executed by a processor. If implemented in code executed by a processor, the functions of the communications manager 420, the receiver 410, the transmitter 415, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for transmitting, to a base station, a UE capability to support receipt of multiple related downlink control channel transmissions, where the multiple related downlink control channel transmissions that are supported are one or more of SFN downlink control channel transmissions, intra-slot downlink control channel repetitions, or inter-slot downlink control channel repetitions, and are associated with one or more CORESETs. The communications manager 420 may be configured as or otherwise support a means for receiving, from the base station based on transmission of the UE capability, a configuration for receiving the multiple related downlink control channel transmissions. The communications manager 420 may be configured as or otherwise support a means for monitoring a downlink control channel in accordance with the configuration.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improved scheduling of wireless communications. In particular, by enabling UEs 115 to inform the network (e.g., base station 105) of their capability to support one or more configurations for PDCCH repetition (e.g., SFN PDCCH transmissions, inter-slot PDCCH repetitions, intra-slot PDCCH repetitions), techniques described herein may enable the network to communicate with the UEs 115 using the respective configurations for PDCCH repetitions depending on the characteristics of the network (e.g., quantity of data traffic, noise) as well as the capabilities of the UEs 115. Thus, techniques described herein may enable more widespread use of communications using PDCCH repetitions within the wireless communications system, thereby improving a reliability of wireless communications, improving transmission diversity, and further protecting wireless communications against interference.

Figure 5:
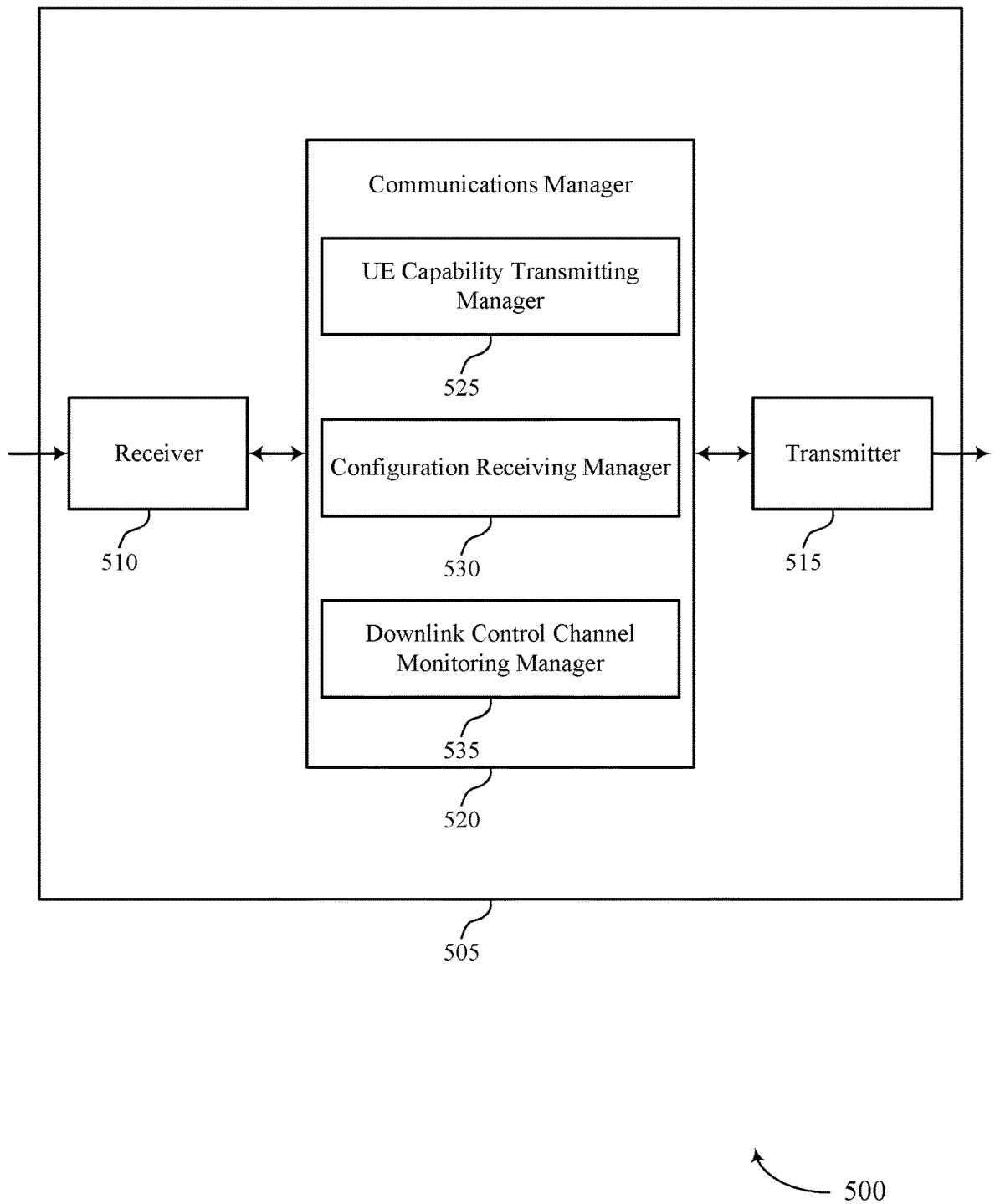

FIG. 5 shows a block diagram 500 of a device 505 that supports techniques for signaling user equipment capability for PDCCH repetition in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for signaling user equipment capability for PDCCH repetition). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for signaling user equipment capability for PDCCH repetition). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for signaling user equipment capability for PDCCH repetition as described herein. For example, the communications manager 520 may include a UE capability transmitting manager 525, a configuration receiving manager 530, a downlink control channel monitoring manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The UE capability transmitting manager 525 may be configured as or otherwise support a means for transmitting, to a base station, a UE capability to support receipt of multiple related downlink control channel transmissions, where the multiple related downlink control channel transmissions that are supported are one or more of SFN downlink control channel transmissions, intra-slot downlink control channel repetitions, or inter-slot downlink control channel repetitions, and are associated with one or more CORESETs. The configuration receiving manager 530 may be configured as or otherwise support a means for receiving, from the base station based on transmission of the UE capability, a configuration for receiving the multiple related downlink control channel transmissions. The downlink control channel monitoring manager 535 may be configured as or otherwise support a means for monitoring a downlink control channel in accordance with the configuration.

Figure 6:
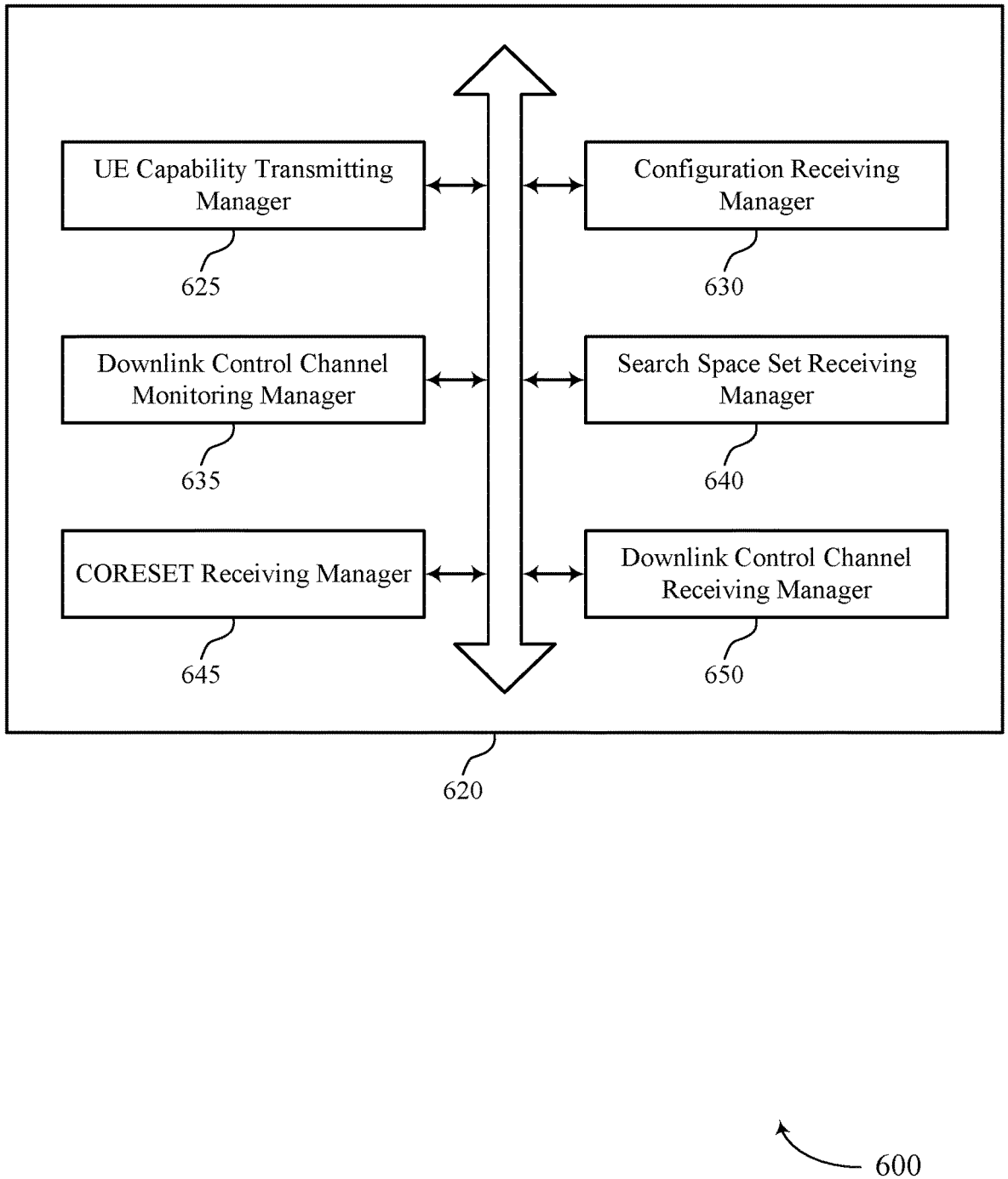
FIG. 6 shows a block diagram of a communications manager that supports techniques for signaling user equipment capability for PDCCH repetition in accordance with aspects of the present disclosure.

FIG. 6 shows a block diagram 600 of a communications manager 620 that supports techniques for signaling user equipment capability for PDCCH repetition in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for signaling user equipment capability for PDCCH repetition as described herein. For example, the communications manager 620 may include a UE capability transmitting manager 625, a configuration receiving manager 630, a downlink control channel monitoring manager 635, a search space set receiving manager 640, a CORESET receiving manager 645, a downlink control channel receiving manager 650, or any combination thereof. Each of these components may communicate, directly or indirectly, with one another (e.g., via one or more buses).

The communications manager 620 may support wireless communication at a UE in accordance with examples as disclosed herein. The UE capability transmitting manager 625 may be configured as or otherwise support a means for transmitting, to a base station, a UE capability to support receipt of multiple related downlink control channel transmissions, where the multiple related downlink control channel transmissions that are supported are one or more of SFN downlink control channel transmissions, intra-slot downlink control channel repetitions, or inter-slot downlink control channel repetitions, and are associated with one or more CORESETs. The configuration receiving manager 630 may be configured as or otherwise support a means for receiving, from the base station based on transmission of the UE capability, a configuration for receiving the multiple related downlink control channel transmissions. The downlink control channel monitoring manager 635 may be configured as or otherwise support a means for monitoring a downlink control channel in accordance with the configuration.

In some examples, the UE capability transmitting manager 625 may be configured as or otherwise support a means for transmitting, as part of the UE capability, an indication that the UE supports receipt of multiple related downlink control channel transmissions which are associated with three or more CORESETs, where the three or more CORESETs are associated with a common BWP, where receiving the configuration is based on the indication that the UE supports receipt of multiple related downlink control channel transmissions which are associated with the three or more CORESETs.

In some examples, the UE capability indicates that the UE supports receipt of inter-slot downlink control channel repetitions, and the search space set receiving manager 640 may be configured as or otherwise support a means for receiving, from the base station, an indication of a first search space set and a second search space set associated with the first search space set, where a first monitoring occasion of the first search space set in a first slot is associated with a second monitoring occasion of the second search space set in a second slot different from the first slot, where the monitoring is based on the indication of the first search space set, the second search space set, or both.

In some examples, the UE capability transmitting manager 625 may be configured as or otherwise support a means for transmitting, as part of the UE capability, an indication of a quantity of slots between a first downlink control channel transmission and a second downlink control channel transmission associated with the first downlink control channel transmission that are capable of being decoded by the UE, where receiving the indication of the first search space set, the second search space set, or both, is based on the quantity of slots.

In some examples, the UE capability transmitting manager 625 may be configured as or otherwise support a means for transmitting, as part of the UE capability, an indication of a maximum number of slots across which the UE supports one or more linked search space sets for inter-slot downlink control channel repetitions in accordance with a search space set periodicity for the one or more linked search space sets.

In some examples, the UE capability indicates that the UE supports receipt of intra-slot downlink control channel repetitions, and the search space set receiving manager 640 may be configured as or otherwise support a means for receiving, from the base station, an indication a first search space set and a second search space set associated with the first search space set, where a first monitoring occasion of the first search space set is associated with a second monitoring occasion of the second search space set, where both the first monitoring occasion and the second monitoring occasion are located in a common slot, where the monitoring is based on the indication of the first search space set, the second search space set, or both.

In some examples, the UE capability transmitting manager 625 may be configured as or otherwise support a means for transmitting, as part of the UE capability, an indication that the UE supports receipt of downlink control channel transmissions which are received within the first monitoring occasion of the first search space set, the second monitoring occasion of the second search space set, or both, where the first monitoring occasion and the second monitoring occasion at least partially overlap in the time domain, the frequency domain, or both, where receiving the indication of the first search space set, the second search space set, or both, is based on the indication that the UE supports receipt of downlink control channel transmissions which are received within the first monitoring occasion of the first search space set, the second monitoring occasion of the second search space set, or both.

In some examples, the UE capability transmitting manager 625 may be configured as or otherwise support a means for transmitting, as part of the UE capability, an indication of a quantity of downlink control channel monitoring occasions within one or more slots which are monitored by the UE. In some examples, the search space set receiving manager 640 may be configured as or otherwise support a means for receiving, from the base station based on the indication of the quantity of downlink control channel monitoring occasions, an indication of a first search space set and a second search space set associated with the first search space set, where the monitoring is based on the indication of the first search space set, the second search space set, or both.

In some examples, the UE capability transmitting manager 625 may be configured as or otherwise support a means for transmitting, as part of the UE capability, an indication that the UE supports monitoring of a set of UE-specific search space sets, a set of common search space sets, or both. In some examples, the search space set receiving manager 640 may be configured as or otherwise support a means for receiving, from the base station, an indication of a first search space set and a second search space set associated with the first search space set based on the indication that the UE supports the monitoring of the set of search space sets which is associated with the UE, the set of common search space sets, or both, where the monitoring is based on the indication of the first search space set, the second search space set, or both.

In some examples, the UE capability transmitting manager 625 may be configured as or otherwise support a means for transmitting, as part of the UE capability, an indication of a format for DCI associated with intra-slot downlink control channel repetitions and/or inter-slot downlink control channel repetitions. In some examples, the search space set receiving manager 640 may be configured as or otherwise support a means for receiving, from the base station based on the indication of the format, an indication of a first search space set and a second search space set associated with the first search space set, where the monitoring is based on the indication of the first search space set, the second search space set, or both.

In some examples, the UE capability transmitting manager 625 may be configured as or otherwise support a means for transmitting, as part of the UE capability, an indication that the UE supports receipt of a first downlink control channel transmission associated with a first CORESET associated with a first set of parameters, and a second downlink control channel transmission associated with the first downlink control channel transmission and associated with a second CORESET associated with a second set of parameters, where receiving the configuration is based on the indication that the UE supports receipt of the first downlink control channel transmission and the second downlink control channel transmission.

In some examples, the first set of parameters, the second set of parameters, or both, include a CORESET duration, a CCE-resource element group mapping type, a precoding granularity, a CORESET pool index, or any combination thereof. In some examples, the first set of parameters is different from the second set of parameters.

In some examples, the UE capability transmitting manager 625 may be configured as or otherwise support a means for transmitting, as part of the UE capability, an indication that the UE supports monitoring of a quantity of control channel candidates per span of resources, a quantity of CCEs per span of resources, or both, where receiving the configuration is based on the indication of the quantity of control channel candidates per span of resources, the quantity of CCEs per span of resources, or both.

In some examples, the UE capability indicates that the UE supports receipt of SFN downlink control channel transmissions, and the CORESET receiving manager 645 may be configured as or otherwise support a means for receiving, from the base station, an indication of a CORESET including two TCI states, where the monitoring is based on the indication of the CORESET.

In some examples, the UE capability indicates that the UE supports receipt of SFN downlink control channel transmissions, and the UE capability transmitting manager 625 may be configured as or otherwise support a means for transmitting, as part of the UE capability, an indication of a quantity of CORESETs within a BWP, where receiving the configuration is based on the indication of the quantity of CORESETs within the BWP.

In some examples, the downlink control channel receiving manager 650 may be configured as or otherwise support a means for receiving, from the base station based on the monitoring, a first downlink control channel transmission and a second downlink control channel transmission associated with the first downlink control channel transmission, where the first downlink control channel transmission and the second downlink control channel transmission are transmitted based on the configuration.

In some examples, the multiple related downlink control channel transmissions are transmitted according to a 5G radio access technology, a NR access technology, or both.

Figure 7:
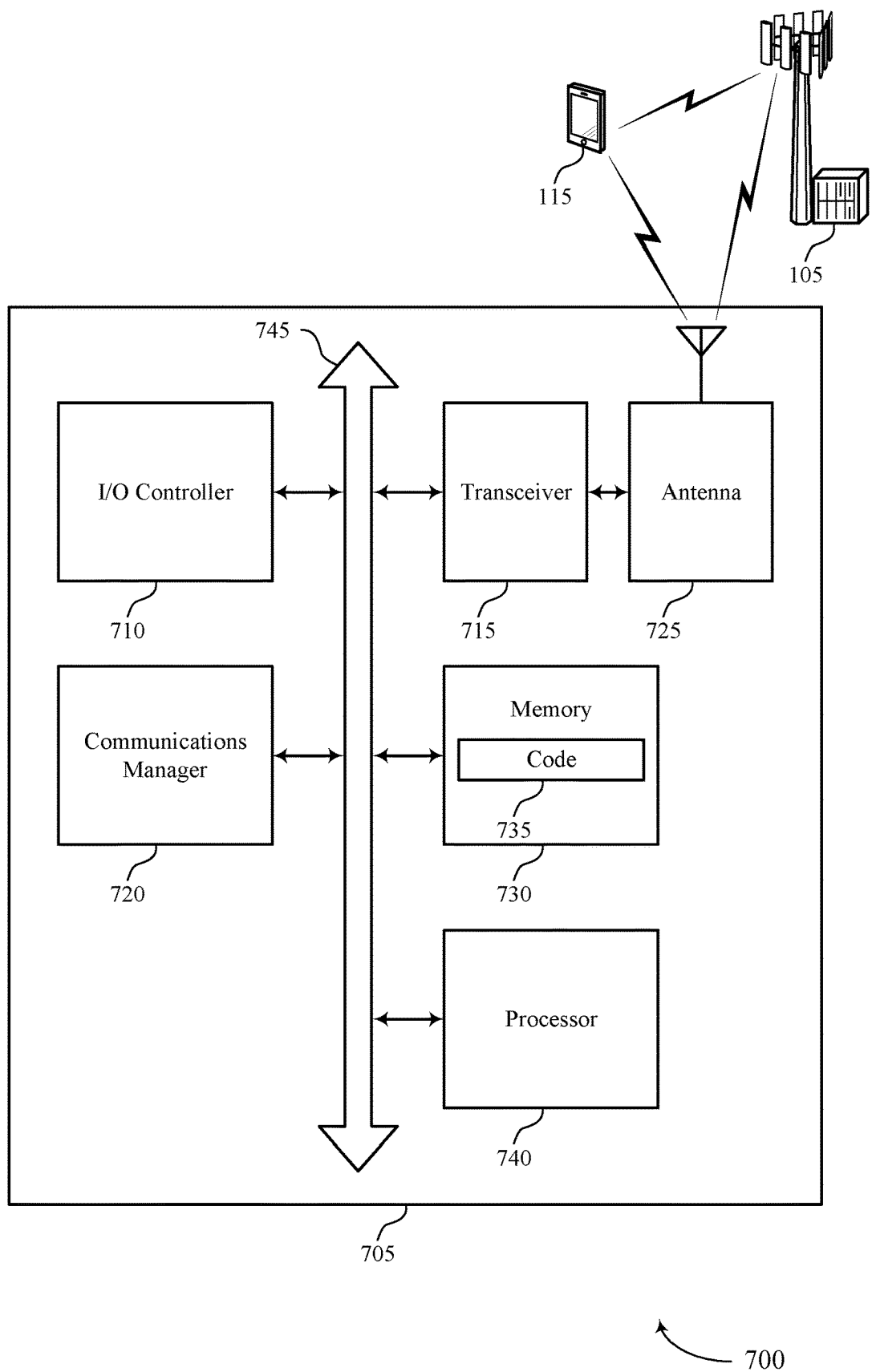
FIG. 7 shows a diagram of a system including a device that supports techniques for signaling user equipment capability for PDCCH repetition in accordance with aspects of the present disclosure.

FIG. 7 shows a diagram of a system 700 including a device 705 that supports techniques for signaling user equipment capability for PDCCH repetition in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for signaling user equipment capability for PDCCH repetition). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for transmitting, to a base station, a UE capability to support receipt of multiple related downlink control channel transmissions, where the multiple related downlink control channel transmissions that are supported are one or more of SFN downlink control channel transmissions, intra-slot downlink control channel repetitions, or inter-slot downlink control channel repetitions, and are associated with one or more CORESETs. The communications manager 720 may be configured as or otherwise support a means for receiving, from the base station based on transmission of the UE capability, a configuration for receiving the multiple related downlink control channel transmissions. The communications manager 720 may be configured as or otherwise support a means for monitoring a downlink control channel in accordance with the configuration.

By including or configuring the communications manager 720 in accordance with examples as described herein, the device 705 may support techniques for improved scheduling of wireless communications. In particular, by enabling UEs 115 to inform the network (e.g., base station 105) of their capability to support one or more configurations for PDCCH repetition (e.g., SFN PDCCH transmissions, inter-slot PDCCH repetitions, intra-slot PDCCH repetitions), techniques described herein may enable the network to communicate with the UEs 115 using the respective configurations for PDCCH repetitions depending on the characteristics of the network (e.g., quantity of data traffic, noise) as well as the capabilities of the UEs 115. Thus, techniques described herein may enable more widespread use of communications using PDCCH repetitions within the wireless communications system, thereby improving a reliability of wireless communications, improving transmission diversity, and further protecting wireless communications against interference.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for signaling user equipment capability for PDCCH repetition as described herein, or the processor 740 and the memory 730 may be otherwise configured to perform or support such operations.

Figure 8:
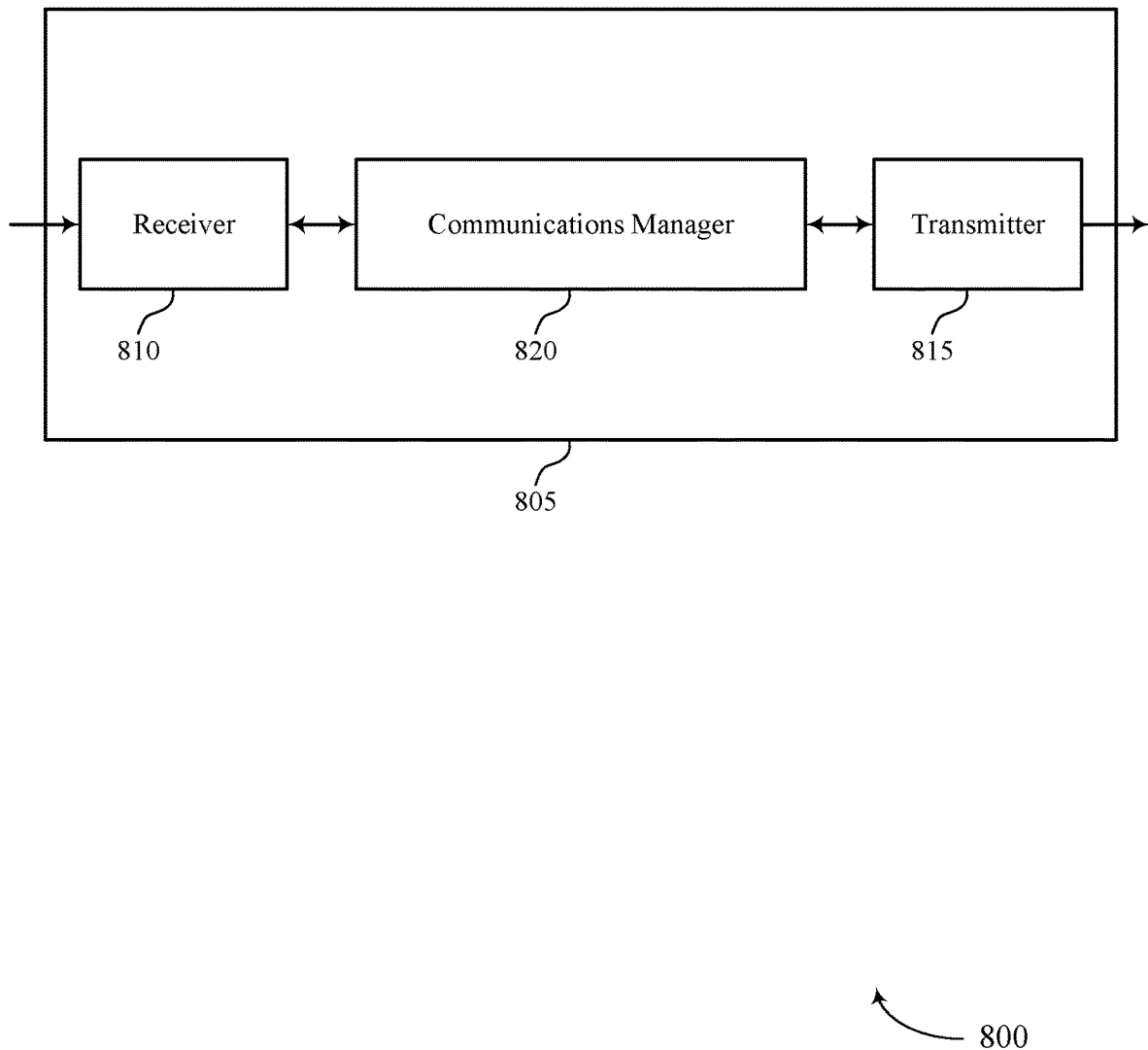
FIGS. 8 and 9 show block diagrams of devices that support techniques for signaling user equipment capability for PDCCH repetition in accordance with aspects of the present disclosure.

FIG. 8 shows a block diagram 800 of a device 805 that supports techniques for signaling user equipment capability for PDCCH repetition in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for signaling user equipment capability for PDCCH repetition). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for signaling user equipment capability for PDCCH repetition). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for signaling user equipment capability for PDCCH repetition as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software) executed by a processor. If implemented in code executed by a processor, the functions of the communications manager 820, the receiver 810, the transmitter 815, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for receiving, from a UE, a UE capability of the UE to support receipt of multiple related downlink control channel transmissions, where the multiple related downlink control channel transmissions that are supported are one or more of SFN downlink control channel transmissions, intra-slot downlink control channel repetitions, or inter-slot downlink control channel repetitions, and are associated with one or more CORESETs. The communications manager 820 may be configured as or otherwise support a means for transmitting, to the UE based on reception of the UE capability, a configuration for transmitting the multiple related downlink control channel transmissions. The communications manager 820 may be configured as or otherwise support a means for communicating with the UE via a downlink control channel in accordance with the configuration.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improved scheduling of wireless communications. In particular, by enabling UEs 115 to inform the network (e.g., base station 105) of their capability to support one or more configurations for PDCCH repetition (e.g., SFN PDCCH transmissions, inter-slot PDCCH repetitions, intra-slot PDCCH repetitions), techniques described herein may enable the network to communicate with the UEs 115 using the respective configurations for PDCCH repetitions depending on the characteristics of the network (e.g., quantity of data traffic, noise) as well as the capabilities of the UEs 115. Thus, techniques described herein may enable more widespread use of communications using PDCCH repetitions within the wireless communications system, thereby improving a reliability of wireless communications, improving transmission diversity, and further protecting wireless communications against interference.

Figure 9:
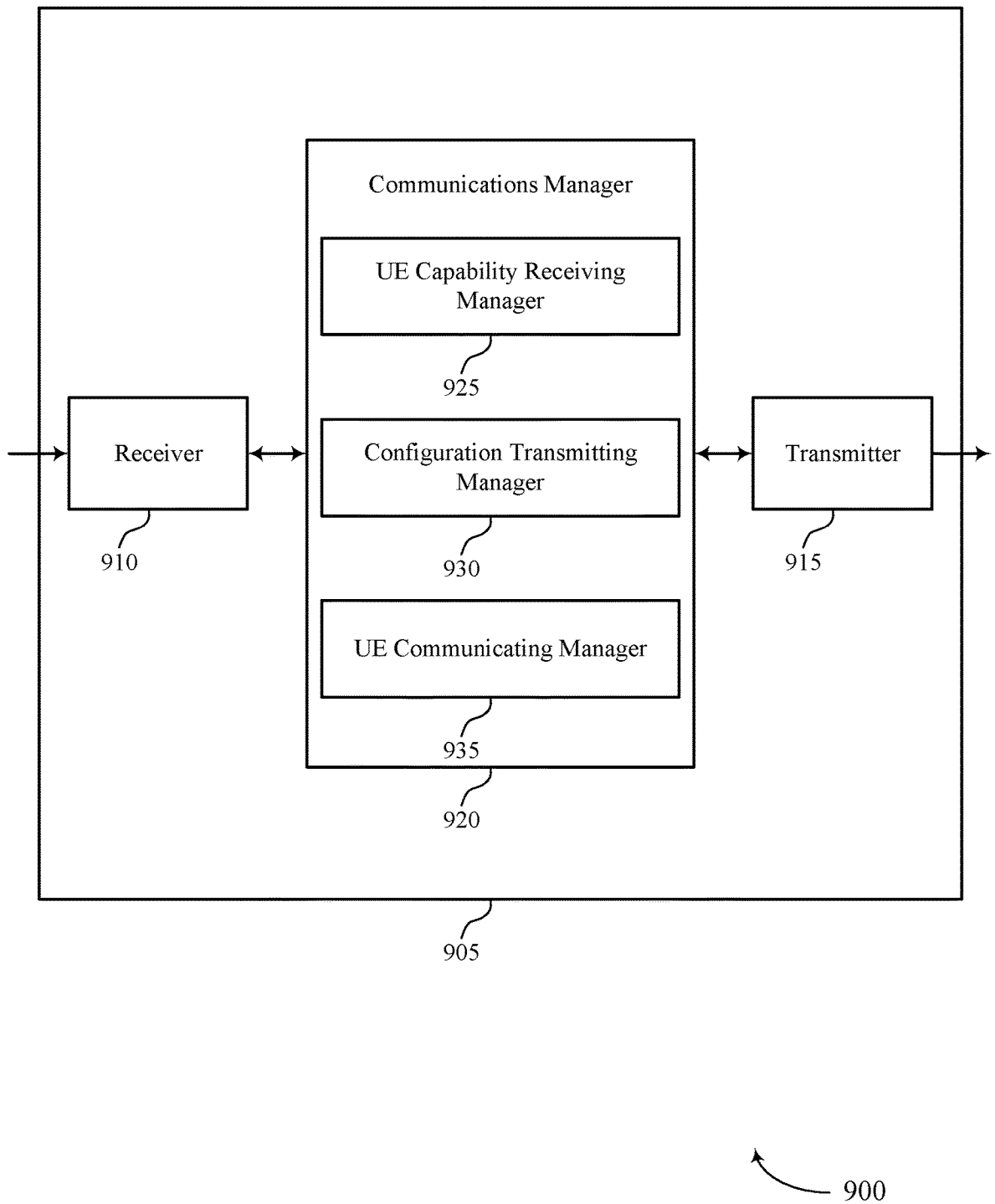

FIG. 9 shows a block diagram 900 of a device 905 that supports techniques for signaling user equipment capability for PDCCH repetition in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for signaling user equipment capability for PDCCH repetition). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for signaling user equipment capability for PDCCH repetition). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for signaling user equipment capability for PDCCH repetition as described herein. For example, the communications manager 920 may include a UE capability receiving manager 925, a configuration transmitting manager 930, a UE communicating manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The UE capability receiving manager 925 may be configured as or otherwise support a means for receiving, from a UE, a UE capability of the UE to support receipt of multiple related downlink control channel transmissions, where the multiple related downlink control channel transmissions that are supported are one or more of SFN downlink control channel transmissions, intra-slot downlink control channel repetitions, or inter-slot downlink control channel repetitions, and are associated with one or more CORESETs. The configuration transmitting manager 930 may be configured as or otherwise support a means for transmitting, to the UE based on reception of the UE capability, a configuration for transmitting the multiple related downlink control channel transmissions. The UE communicating manager 935 may be configured as or otherwise support a means for communicating with the UE via a downlink control channel in accordance with the configuration.

Figure 10:
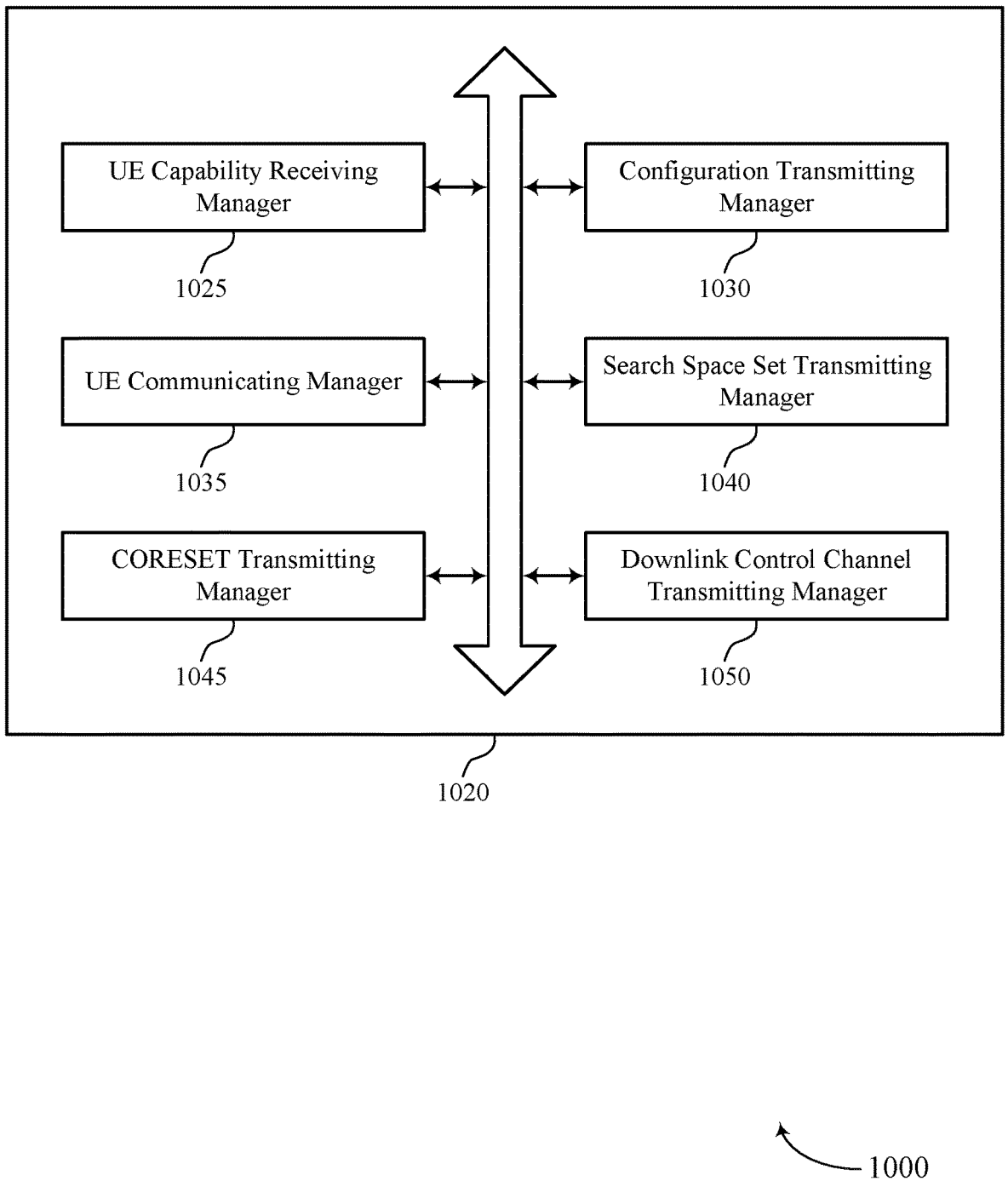
FIG. 10 shows a block diagram of a communications manager that supports techniques for signaling user equipment capability for PDCCH repetition in accordance with aspects of the present disclosure.

FIG. 10 shows a block diagram 1000 of a communications manager 1020 that supports techniques for signaling user equipment capability for PDCCH repetition in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for signaling user equipment capability for PDCCH repetition as described herein. For example, the communications manager 1020 may include a UE capability receiving manager 1025, a configuration transmitting manager 1030, a UE communicating manager 1035, a search space set transmitting manager 1040, a CORESET transmitting manager 1045, a downlink control channel transmitting manager 1050, or any combination thereof. Each of these components may communicate, directly or indirectly, with one another (e.g., via one or more buses).

The communications manager 1020 may support wireless communication at a base station in accordance with examples as disclosed herein. The UE capability receiving manager 1025 may be configured as or otherwise support a means for receiving, from a UE, a UE capability of the UE to support receipt of multiple related downlink control channel transmissions, where the multiple related downlink control channel transmissions that are supported are one or more of SFN downlink control channel transmissions, intra-slot downlink control channel repetitions, or inter-slot downlink control channel repetitions, and are associated with one or more CORESETs. The configuration transmitting manager 1030 may be configured as or otherwise support a means for transmitting, to the UE based on reception of the UE capability, a configuration for transmitting the multiple related downlink control channel transmissions. The UE communicating manager 1035 may be configured as or otherwise support a means for communicating with the UE via a downlink control channel in accordance with the configuration.

In some examples, the UE capability receiving manager 1025 may be configured as or otherwise support a means for receiving, as part of the UE capability, an indication that the UE supports receipt of multiple related downlink control channel transmissions which are associated with three or more CORESETs, where the three or more CORESETs are associated with a common BWP, where transmitting the configuration is based on the indication that the UE supports receipt of multiple related downlink control channel transmissions which are associated with the three or more CORESETs.

In some examples, the UE capability indicates that the UE supports receipt of inter-slot downlink control channel repetitions, and the search space set transmitting manager 1040 may be configured as or otherwise support a means for transmitting, to the UE, an indication of a first search space set and a second search space set associated with the first search space set, where a first monitoring occasion of the first search space set in a first slot is associated with a second monitoring occasion of the second search space set in a second slot different from the first slot, where the communicating is based on the indication of the first search space set, the second search space set, or both.

In some examples, the UE capability receiving manager 1025 may be configured as or otherwise support a means for receiving, as part of the UE capability, an indication of a quantity of slots between a first downlink control channel transmission and a second downlink control channel transmission associated with the first downlink control channel transmission that are capable of being decoded by the UE, where transmitting the indication of the first search space set, the second search space set, or both, is based on the quantity of slots.

In some examples, the UE capability receiving manager 1025 may be configured as or otherwise support a means for receiving, as part of the UE capability, an indication of a maximum number of slots across which the UE supports one or more linked search space sets for inter-slot downlink control channel repetitions in accordance with a search space set periodicity for the one or more linked search space sets.

In some examples, the UE capability indicates that the UE supports receipt of intra-slot downlink control channel repetitions, and the search space set transmitting manager 1040 may be configured as or otherwise support a means for transmitting, to the UE, an indication a first search space set and a second search space set associated with the first search space set, where a first monitoring occasion of the first search space set is associated with a second monitoring occasion of the second search space set, where both the first monitoring occasion and the second monitoring occasion are located in a common slot, where the communicating is based on the indication of the first search space set, the second search space set, or both.

In some examples, the UE capability receiving manager 1025 may be configured as or otherwise support a means for receiving, as part of the UE capability, an indication that the UE supports receipt of downlink control channel transmissions which are received within the first monitoring occasion of the first search space set, the second monitoring occasion of the second search space set, or both, where the first monitoring occasion and the second monitoring occasion at least partially overlap in the time domain, the frequency domain, or both, where transmitting the indication of the first search space set, the second search space set, or both, is based on the indication that the UE supports receipt of downlink control channel transmissions which are received within the first monitoring occasion of the first search space set, the second monitoring occasion of the second search space set, or both.

In some examples, the UE capability receiving manager 1025 may be configured as or otherwise support a means for receiving, as part of the UE capability, an indication of a quantity of downlink control channel monitoring occasions within the one or more slots which are monitored by the UE. In some examples, the search space set transmitting manager 1040 may be configured as or otherwise support a means for transmitting, to the UE based on the indication of the quantity of downlink control channel monitoring occasions, an indication of a first search space set and a second search space set associated with the first search space set, where communicating with the UE is based on the indication of the first search space set, the second search space set, or both.

In some examples, the UE capability receiving manager 1025 may be configured as or otherwise support a means for receiving, as part of the UE capability, an indication that the UE supports monitoring of a set of UE-specific search space sets, a set of common search space sets, or both. In some examples, the search space set transmitting manager 1040 may be configured as or otherwise support a means for transmitting, to the UE, an indication of a first search space set and a second search space set associated with the first search space set based on the indication that the UE supports the monitoring of the set of search space sets which is associated with the UE, the set of common search space sets, or both, where communicating with the UE is based on the indication of the first search space set, the second search space set, or both.

In some examples, the UE capability receiving manager 1025 may be configured as or otherwise support a means for receiving, as part of the UE capability, an indication of a format for DCI associated with intra-slot downlink control channel repetitions and/or inter-slot downlink control channel repetitions. In some examples, the search space set transmitting manager 1040 may be configured as or otherwise support a means for transmitting, to the UE based on the indication of the format, an indication of a first search space set and a second search space set associated with the first search space set, where communicating with the UE is based on the indication of the first search space set, the second search space set, or both.

In some examples, the UE capability receiving manager 1025 may be configured as or otherwise support a means for receiving, as part of the UE capability, an indication that the UE supports receipt of a first downlink control channel transmission associated with a first CORESET associated with a first set of parameters, and a second downlink control channel transmission associated with the first downlink control channel transmission and associated with a second CORESET associated with a second set of parameters, where transmitting the configuration is based on the indication that the UE supports receipt of the first downlink control channel transmission and the second downlink control channel transmission.

In some examples, the first set of parameters, the second set of parameters, or both, include a CORESET duration, a CCE-resource element group mapping type, a precoding granularity, a CORESET pool index, or any combination thereof. In some examples, the first set of parameters is different from the second set of parameters.

In some examples, the UE capability receiving manager 1025 may be configured as or otherwise support a means for receiving, as part of the UE capability, an indication that the UE supports monitoring of a quantity of control channel candidates per span of resources, a quantity of CCEs per span of resources, or both, where transmitting the configuration is based on the indication of the quantity of control channel candidates per span of resources, the quantity of CCEs per span of resources, or both.

In some examples, the UE capability indicates that the UE supports receipt of SFN downlink control channel transmissions, and the CORESET transmitting manager 1045 may be configured as or otherwise support a means for transmitting, to the UE, an indication of a CORESET including two TCI states, where the communicating is based on the indication of the CORESET.

In some examples, the UE capability indicates that the UE supports receipt of SFN downlink control channel transmissions, and the UE capability receiving manager 1025 may be configured as or otherwise support a means for receiving, as part of the UE capability, an indication of a quantity of CORESETs within a BWP, where transmitting the configuration is based on the indication of the quantity of CORESETs within the BWP.

In some examples, to support communicating with the UE, the downlink control channel transmitting manager 1050 may be configured as or otherwise support a means for transmitting, to the UE, a first downlink control channel transmission and a second downlink control channel transmission associated with the first downlink control channel transmission, where the first downlink control channel transmission and the second downlink control channel transmission are transmitted based on the configuration.

In some examples, the multiple related downlink control channel transmissions are transmitted according to a 5G radio access technology, a NR access technology, or both.

Figure 11:
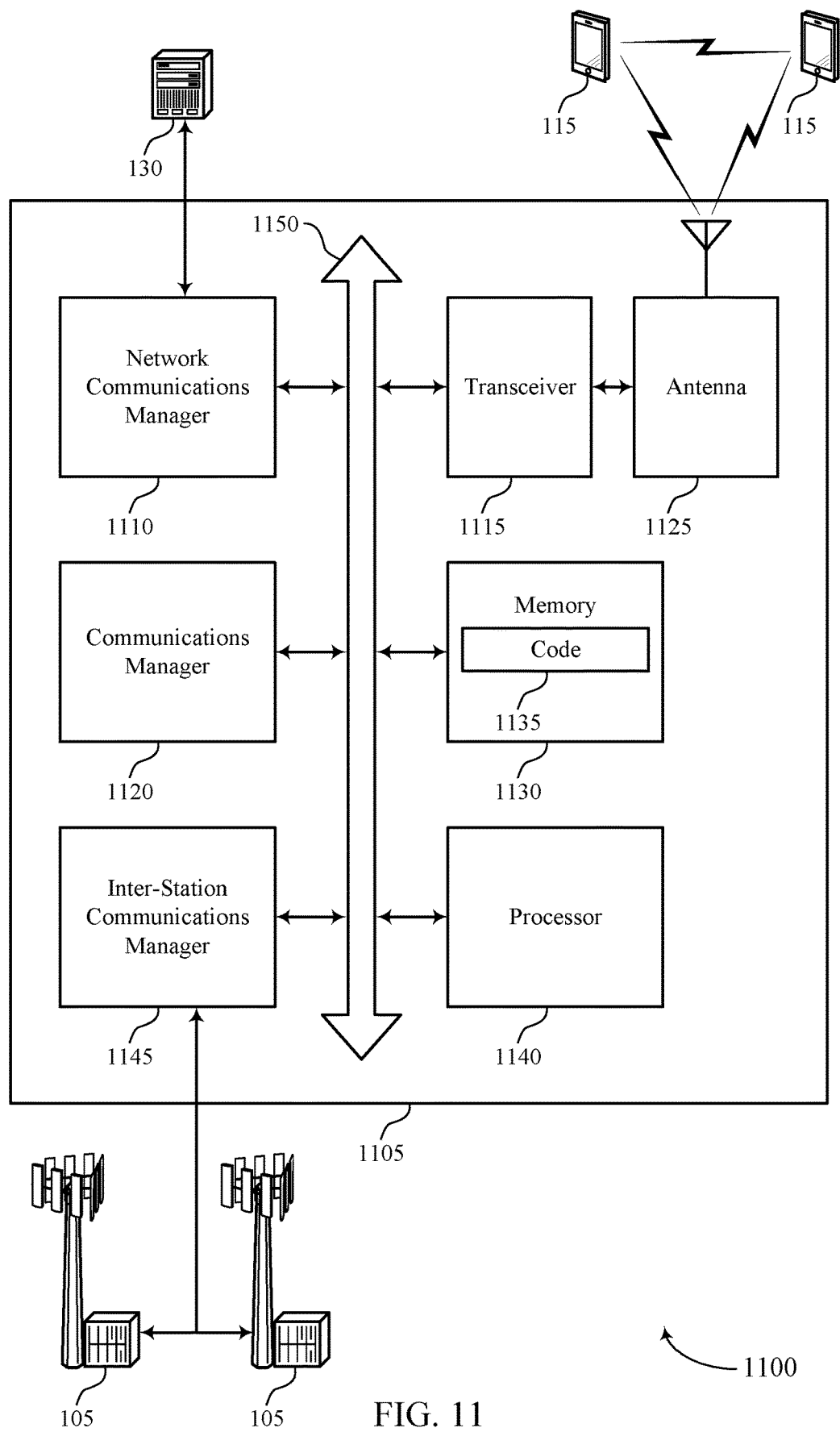
FIG. 11 shows a diagram of a system including a device that supports techniques for signaling user equipment capability for PDCCH repetition in accordance with aspects of the present disclosure.

FIG. 11 shows a diagram of a system 1100 including a device 1105 that supports techniques for signaling user equipment capability for PDCCH repetition in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for signaling user equipment capability for PDCCH repetition). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for receiving, from a UE, a UE capability of the UE to support receipt of multiple related downlink control channel transmissions, where the multiple related downlink control channel transmissions that are supported are one or more of SFN downlink control channel transmissions, intra-slot downlink control channel repetitions, or inter-slot downlink control channel repetitions, and are associated with one or more CORESETs. The communications manager 1120 may be configured as or otherwise support a means for transmitting, to the UE based on reception of the UE capability, a configuration for transmitting the multiple related downlink control channel transmissions. The communications manager 1120 may be configured as or otherwise support a means for communicating with the UE via a downlink control channel in accordance with the configuration.

By including or configuring the communications manager 1120 in accordance with examples as described herein, the device 1105 may support techniques for improved scheduling of wireless communications. In particular, by enabling UEs 115 to inform the network (e.g., base station 105) of their capability to support one or more configurations for PDCCH repetition (e.g., SFN PDCCH transmissions, inter-slot PDCCH repetitions, intra-slot PDCCH repetitions), techniques described herein may enable the network to communicate with the UEs 115 using the respective configurations for PDCCH repetitions depending on the characteristics of the network (e.g., quantity of data traffic, noise) as well as the capabilities of the UEs 115. Thus, techniques described herein may enable more widespread use of communications using PDCCH repetitions within the wireless communications system, thereby improving a reliability of wireless communications, improving transmission diversity, and further protecting wireless communications against interference.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for signaling user equipment capability for PDCCH repetition as described herein, or the processor 1140 and the memory 1130 may be otherwise configured to perform or support such operations.

Figure 12:
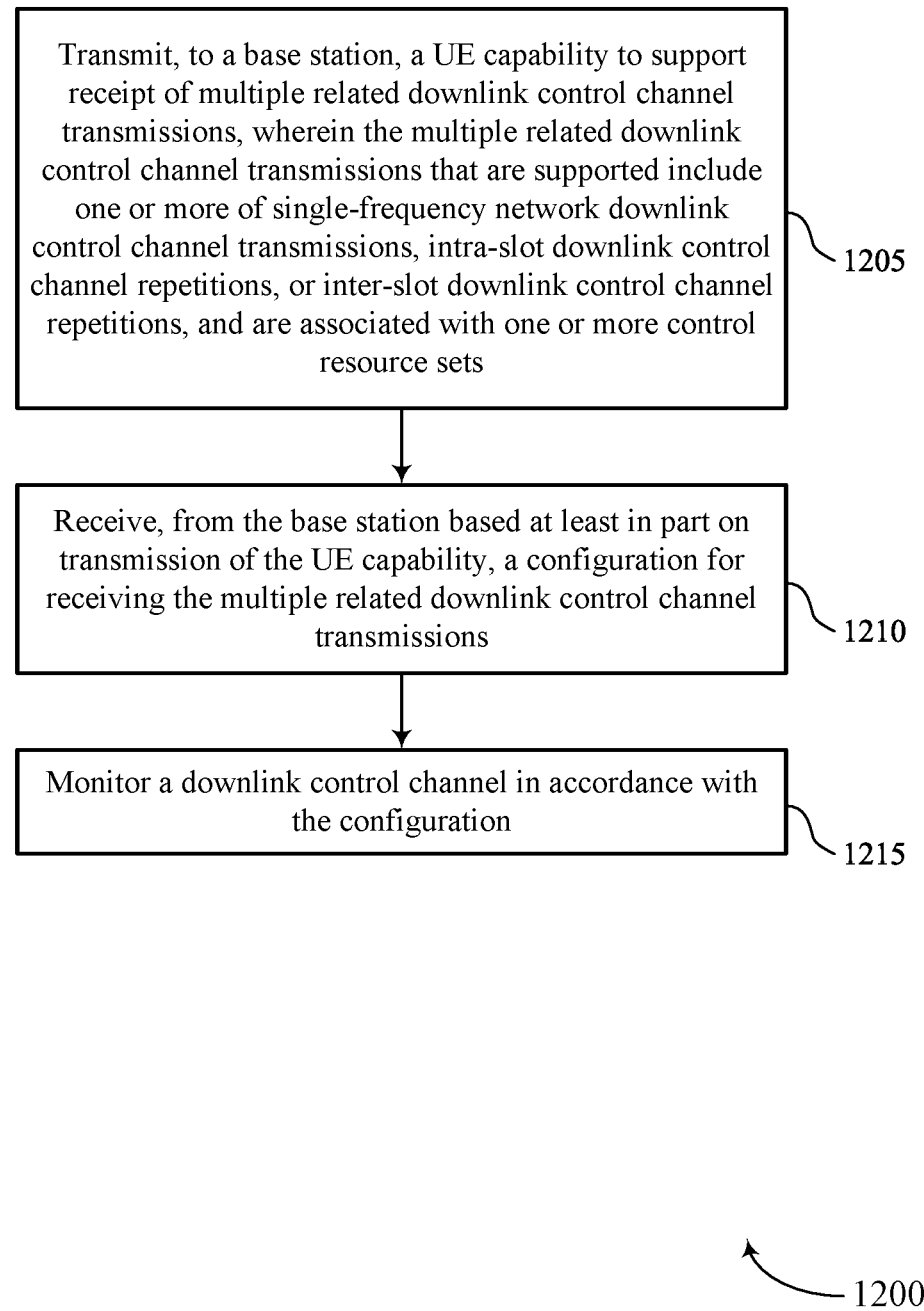
FIGS. 12 through 14 show flowcharts illustrating methods that support techniques for signaling user equipment capability for PDCCH repetition in accordance with aspects of the present disclosure.

FIG. 12 shows a flowchart illustrating a method 1200 that supports techniques for signaling user equipment capability for PDCCH repetition in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include transmitting, to a base station, a UE capability to support receipt of multiple related downlink control channel transmissions, where the multiple related downlink control channel transmissions that are supported include one or more of SFN downlink control channel transmissions, intra-slot downlink control channel repetitions, or inter-slot downlink control channel repetitions, and are associated with one or more CORESETs. The operations of 1205 may be performed in accordance with examples as disclosed herein. In some examples, aspects of the operations of 1205 may be performed by a UE capability transmitting manager 625 as described with reference to FIG. 6.

At 1210, the method may include receiving, from the base station based at least in part on transmission of the UE capability, a configuration for receiving the multiple related downlink control channel transmissions. The operations of 1210 may be performed in accordance with examples as disclosed herein. In some examples, aspects of the operations of 1210 may be performed by a configuration receiving manager 630 as described with reference to FIG. 6.

At 1215, the method may include monitoring a downlink control channel in accordance with the configuration. The operations of 1215 may be performed in accordance with examples as disclosed herein. In some examples, aspects of the operations of 1215 may be performed by a downlink control channel monitoring manager 635 as described with reference to FIG. 6.

Figure 13:
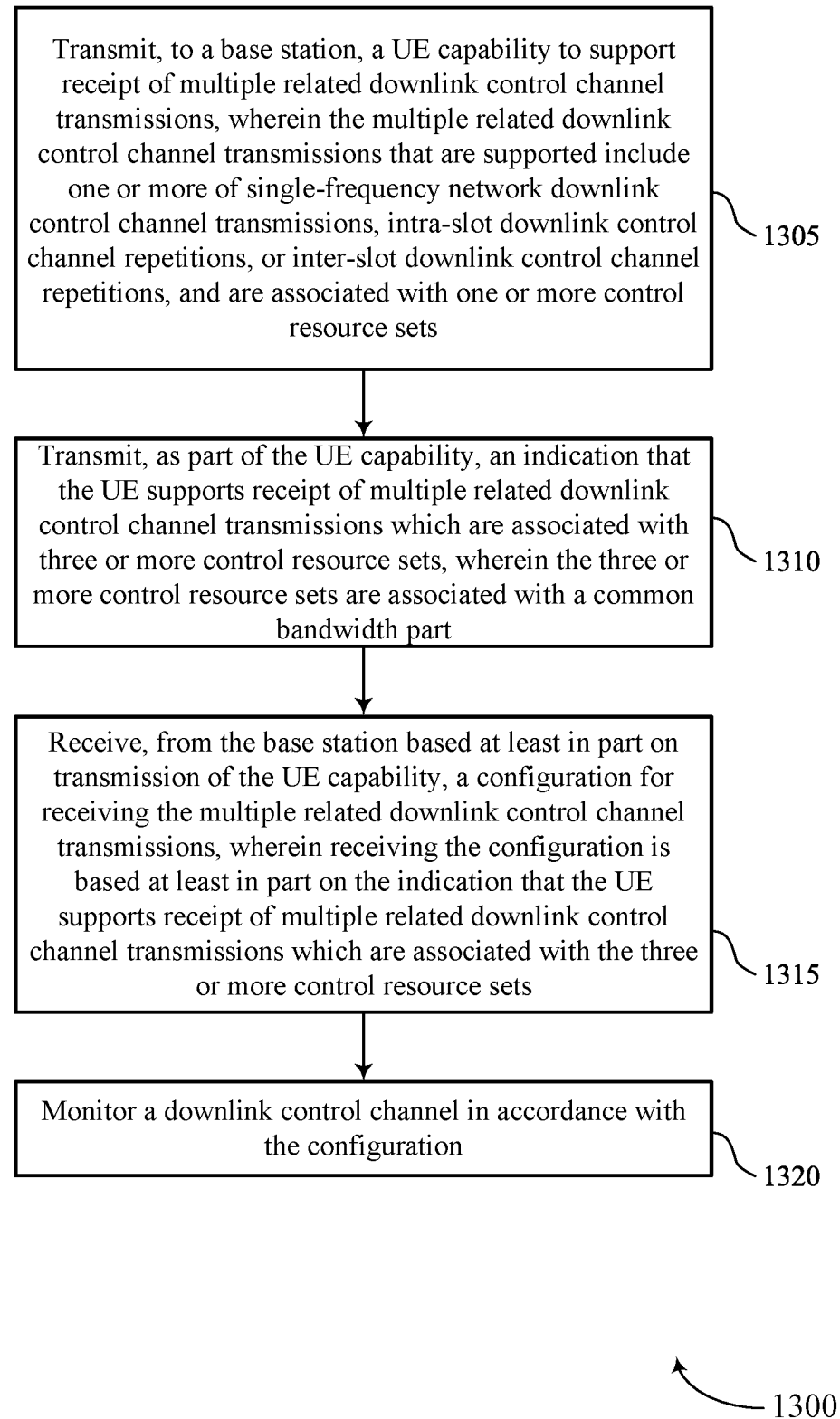

FIG. 13 shows a flowchart illustrating a method 1300 that supports techniques for signaling user equipment capability for PDCCH repetition in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting, to a base station, a UE capability to support receipt of multiple related downlink control channel transmissions, where the multiple related downlink control channel transmissions that are supported include one or more of SFN downlink control channel transmissions, intra-slot downlink control channel repetitions, or inter-slot downlink control channel repetitions, and are associated with one or more CORESETs. The operations of 1305 may be performed in accordance with examples as disclosed herein. In some examples, aspects of the operations of 1305 may be performed by a UE capability transmitting manager 625 as described with reference to FIG. 6.

At 1310, the method may include transmitting, as part of the UE capability, an indication that the UE supports receipt of multiple related downlink control channel transmissions which are associated with three or more CORESETs, where the three or more CORESETs are associated with a common BWP. The operations of 1310 may be performed in accordance with examples as disclosed herein. In some examples, aspects of the operations of 1310 may be performed by a UE capability transmitting manager 625 as described with reference to FIG. 6.

At 1315, the method may include receiving, from the base station based on transmission of the UE capability, a configuration for receiving the multiple related downlink control channel transmissions, where receiving the configuration is based at least in part on the indication that the UE supports receipt of multiple related downlink control channel transmissions which are associated with the three or more CORESETs. The operations of 1315 may be performed in accordance with examples as disclosed herein. In some examples, aspects of the operations of 1315 may be performed by a configuration receiving manager 630 as described with reference to FIG. 6.

At 1320, the method may include monitoring a downlink control channel in accordance with the configuration. The operations of 1320 may be performed in accordance with examples as disclosed herein. In some examples, aspects of the operations of 1320 may be performed by a downlink control channel monitoring manager 635 as described with reference to FIG. 6.

Figure 14:
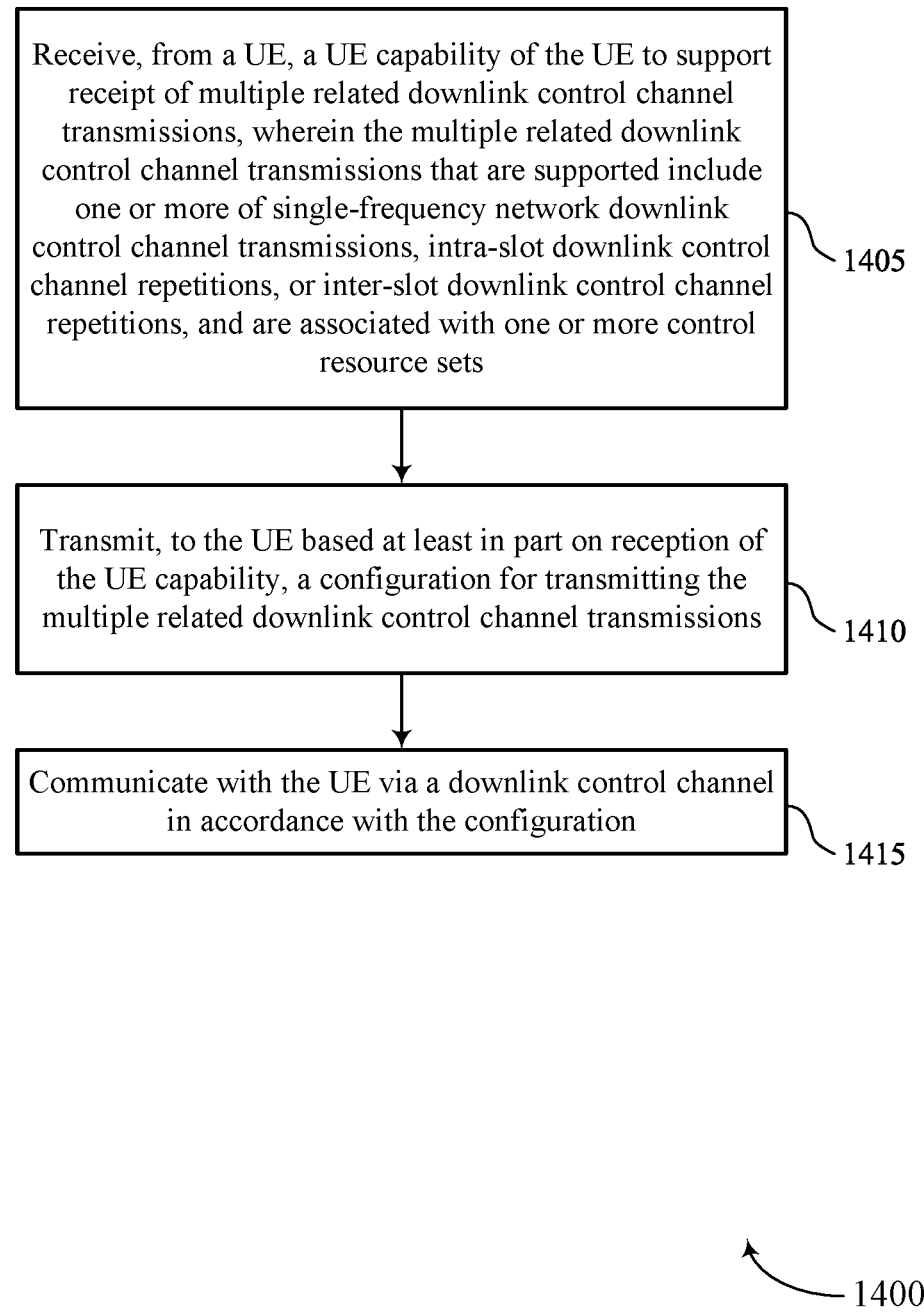

FIG. 14 shows a flowchart illustrating a method 1400 that supports techniques for signaling user equipment capability for PDCCH repetition in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1405, the method may include receiving, from a UE, a UE capability of the UE to support receipt of multiple related downlink control channel transmissions, where the multiple related downlink control channel transmissions that are supported include one or more of SFN downlink control channel transmissions, intra-slot downlink control channel repetitions, or inter-slot downlink control channel repetitions, and are associated with one or more CORESETs. The operations of 1405 may be performed in accordance with examples as disclosed herein. In some examples, aspects of the operations of 1405 may be performed by a UE capability receiving manager 1025 as described with reference to FIG. 10.

At 1410, the method may include transmitting, to the UE based at least in part on reception of the UE capability, a configuration for transmitting the multiple related downlink control channel transmissions. The operations of 1410 may be performed in accordance with examples as disclosed herein. In some examples, aspects of the operations of 1410 may be performed by a configuration transmitting manager 1030 as described with reference to FIG. 10.

At 1415, the method may include communicating with the UE via a downlink control channel in accordance with the configuration. The operations of 1415 may be performed in accordance with examples as disclosed herein. In some examples, aspects of the operations of 1415 may be performed by a UE communicating manager 1035 as described with reference to FIG. 10.

The following provides an overview of aspects of the present disclosure:

Aspect 1: A method for wireless communication at a UE, comprising: transmitting, to a base station, a UE capability to support receipt of multiple related downlink control channel transmissions, wherein the multiple related downlink control channel transmissions that are supported comprise one or more of SFN downlink control channel transmissions, intra-slot downlink control channel repetitions, or inter-slot downlink control channel repetitions, and are associated with one or more CORESETs; receiving, from the base station based at least in part on transmission of the UE capability, a configuration for receiving the multiple related downlink control channel transmissions; and monitoring a downlink control channel in accordance with the configuration.

Aspect 2: The method of aspect 1, further comprising: transmitting, as part of the UE capability, an indication that the UE supports receipt of multiple related downlink control channel transmissions which are associated with three or more CORESETs, wherein the three or more CORESETs are associated with a common BWP, wherein receiving the configuration is based at least in part on the indication that the UE supports receipt of multiple related downlink control channel transmissions which are associated with the three or more CORESETs.

Aspect 3: The method of any of aspects 1 through 2, wherein the UE capability indicates that the UE supports receipt of inter-slot downlink control channel repetitions, the method further comprising: receiving, from the base station, an indication of a first search space set and a second search space set associated with the first search space set, where a first monitoring occasion of the first search space set in a first slot is associated with a second monitoring occasion of the second search space set in a second slot different from the first slot, wherein the monitoring is based at least in part on the indication of the first search space set, the second search space set, or both.

Aspect 4: The method of aspect 3, further comprising: transmitting, as part of the UE capability, an indication of a quantity of slots between a first downlink control channel transmission and a second downlink control channel transmission associated with the first downlink control channel transmission that are capable of being decoded by the UE, wherein receiving the indication of the first search space set, the second search space set, or both, is based at least in part on the quantity of slots.

Aspect 5: The method of any of aspects 1 through 4, further comprising: transmitting, as part of the UE capability, an indication of a maximum number of slots across which the UE supports one or more linked search space sets for inter-slot downlink control channel repetitions in accordance with a search space set periodicity for the one or more linked search space sets.

Aspect 6: The method of any of aspects 1 through 5, wherein the UE capability indicates that the UE supports receipt of intra-slot downlink control channel repetitions, the method further comprising: receiving, from the base station, an indication a first search space set and a second search space set associated with the first search space set, wherein a first monitoring occasion of the first search space set is associated with a second monitoring occasion of the second search space set, where both the first monitoring occasion and the second monitoring occasion are located in a common slot, wherein the monitoring is based at least in part on the indication of the first search space set, the second search space set, or both.

Aspect 7: The method of aspect 6, further comprising: transmitting, as part of the UE capability, an indication that the UE supports receipt of downlink control channel transmissions which are received within the first monitoring occasion of the first search space set, the second monitoring occasion of the second search space set, or both, wherein the first monitoring occasion and the second monitoring occasion at least partially overlap in the time domain, the frequency domain, or both, wherein receiving the indication of the first search space set, the second search space set, or both, is based at least in part on the indication that the UE supports receipt of downlink control channel transmissions which are received within the first monitoring occasion of the first search space set, the second monitoring occasion of the second search space set, or both.

Aspect 8: The method of any of aspects 1 through 7, further comprising: transmitting, as part of the UE capability, an indication of a quantity of downlink control channel monitoring occasions within one or more slots which are monitored by the UE; and receiving, from the base station based at least in part on the indication of the quantity of downlink control channel monitoring occasions, an indication of a first search space set and a second search space set associated with the first search space set, wherein the monitoring is based at least in part on the indication of the first search space set, the second search space set, or both.

Aspect 9: The method of any of aspects 1 through 8, further comprising: transmitting, as part of the UE capability, an indication that the UE supports monitoring of a set of UE-specific search space sets, a set of common search space sets, or both; and receiving, from the base station, an indication of a first search space set and a second search space set associated with the first search space set based at least in part on the indication that the UE supports the monitoring of the set of search space sets which is associated with the UE, the set of common search space sets, or both, wherein the monitoring is based at least in part on the indication of the first search space set, the second search space set, or both.

Aspect 10: The method of any of aspects 1 through 9, further comprising: transmitting, as part of the UE capability, an indication of a format for DCI associated with intra-slot downlink control channel repetitions, inter-slot downlink control channel repetitions, or both; and receiving, from the base station based at least in part on the indication of the format, an indication of a first search space set and a second search space set associated with the first search space set, wherein the monitoring is based at least in part on the indication of the first search space set, the second search space set, or both.

Aspect 11: The method of any of aspects 1 through 10, further comprising: transmitting, as part of the UE capability, an indication that the UE supports receipt of a first downlink control channel transmission associated with a first CORESET associated with a first set of parameters, and a second downlink control channel transmission associated with the first downlink control channel transmission and associated with a second CORESET associated with a second set of parameters, wherein receiving the configuration is based at least in part on the indication that the UE supports receipt of the first downlink control channel transmission and the second downlink control channel transmission.

Aspect 12: The method of aspect 11, wherein the first set of parameters, the second set of parameters, or both, comprise a CORESET duration, a CCE-REG mapping type, a precoding granularity, a CORESET pool index, or any combination thereof.

Aspect 13: The method of any of aspects 11 through 12, wherein the first set of parameters is different from the second set of parameters.

Aspect 14: The method of any of aspects 1 through 13, further comprising: transmitting, as part of the UE capability, an indication that the UE supports monitoring of a quantity of control channel candidates per span of resources, a quantity of CCEs per span of resources, or both, wherein receiving the configuration is based at least in part on the indication of the quantity of control channel candidates per span of resources, the quantity of CCEs per span of resources, or both.

Aspect 15: The method of any of aspects 1 through 14, wherein the UE capability indicates that the UE supports receipt of SFN downlink control channel transmissions, the method further comprising: receiving, from the base station, an indication of a CORESET comprising two TCI states, wherein the monitoring is based at least in part on the indication of the CORESET.

Aspect 16: The method of any of aspects 1 through 15, wherein the UE capability indicates that the UE supports receipt of SFN downlink control channel transmissions, the method further comprising: transmitting, as part of the UE capability, an indication of a quantity of CORESETs within a BWP, wherein receiving the configuration is based at least in part on the indication of the quantity of CORESETs within the BWP.

Aspect 17: The method of any of aspects 1 through 16, further comprising: receiving, from the base station based at least in part on the monitoring, a first downlink control channel transmission and a second downlink control channel transmission associated with the first downlink control channel transmission, where the first downlink control channel transmission and the second downlink control channel transmission are transmitted based at least in part on the configuration.

Aspect 18: The method of any of aspects 1 through 17, wherein the multiple related downlink control channel transmissions are transmitted according to a 5G radio access technology, a NR access technology, or both.

Aspect 19: The method of any of aspects 1 through 17, further comprising: transmitting, as part of the UE capability, an indication that the UE supports receipt of multiple related downlink control channel transmissions within a same span of resources, within different spans of resources, or both, wherein receiving the configuration, monitoring the downlink control channel, or both, is based on the indication.

Aspect 20: A method for wireless communication at a base station, comprising: receiving, from a UE, a UE capability of the UE to support receipt of multiple related downlink control channel transmissions, wherein the multiple related downlink control channel transmissions that are supported comprise one or more of SFN downlink control channel transmissions, intra-slot downlink control channel repetitions, or inter-slot downlink control channel repetitions, and are associated with one or more CORESETs; transmitting, to the UE based at least in part on reception of the UE capability, a configuration for transmitting the multiple related downlink control channel transmissions; and communicating with the UE via a downlink control channel in accordance with the configuration.

Aspect 21: The method of aspect 20, further comprising: receiving, as part of the UE capability, an indication that the UE supports receipt of multiple related downlink control channel transmissions which are associated with three or more CORESETs, wherein the three or more CORESETs are associated with a common BWP, wherein transmitting the configuration is based at least in part on the indication that the UE supports receipt of multiple related downlink control channel transmissions which are associated with the three or more CORESETs.

Aspect 22: The method of any of aspects 20 through 21, wherein the UE capability indicates that the UE supports receipt of inter-slot downlink control channel repetitions, the method further comprising: transmitting, to the UE, an indication of a first search space set and a second search space set associated with the first search space set, where a first monitoring occasion of the first search space set in a first slot is associated with a second monitoring occasion of the second search space set in a second slot different from the first slot, wherein the communicating is based at least in part on the indication of the first search space set, the second search space set, or both.

Aspect 23: The method of aspect 22, further comprising: receiving, as part of the UE capability, an indication of a quantity of slots between a first downlink control channel transmission and a second downlink control channel transmission associated with the first downlink control channel transmission that are capable of being decoded by the UE, wherein transmitting the indication of the first search space set, the second search space set, or both, is based at least in part on the quantity of slots.

Aspect 24: The method of any of aspects 20 through 23, further comprising: receiving, as part of the UE capability, an indication of a maximum number of slots across which the UE supports one or more linked search space sets for inter-slot downlink control channel repetitions in accordance with a search space set periodicity for the one or more linked search space sets.

Aspect 25: The method of any of aspects 20 through 24, wherein the UE capability indicates that the UE supports receipt of intra-slot downlink control channel repetitions, the method further comprising: transmitting, to the UE, an indication a first search space set and a second search space set associated with the first search space set, wherein a first monitoring occasion of the first search space set is associated with a second monitoring occasion of the second search space set, where both the first monitoring occasion and the second monitoring occasion are located in a common slot, wherein the communicating is based at least in part on the indication of the first search space set, the second search space set, or both.

Aspect 26: The method of aspect 25, further comprising: receiving, as part of the UE capability, an indication that the UE supports receipt of downlink control channel transmissions which are received within the first monitoring occasion of the first search space set, the second monitoring occasion of the second search space set, or both, wherein the first monitoring occasion and the second monitoring occasion at least partially overlap in the time domain, the frequency domain, or both, wherein transmitting the indication of the first search space set, the second search space set, or both, is based at least in part on the indication that the UE supports receipt of downlink control channel transmissions which are received within the first monitoring occasion of the first search space set, the second monitoring occasion of the second search space set, or both.

Aspect 27: The method of any of aspects 20 through 26, further comprising: receiving, as part of the UE capability, an indication of a quantity of downlink control channel monitoring occasions within the one or more slots which are monitored by the UE; and transmitting, to the UE based at least in part on the indication of the quantity of downlink control channel monitoring occasions, an indication of a first search space set and a second search space set associated with the first search space set, wherein communicating with the UE is based at least in part on the indication of the first search space set, the second search space set, or both.

Aspect 28: The method of any of aspects 20 through 27, further comprising: receiving, as part of the UE capability, an indication that the UE supports monitoring of a set of UE-specific search space sets, a set of common search space sets, or both; and transmitting, to the UE, an indication of a first search space set and a second search space set associated with the first search space set based at least in part on the indication that the UE supports the monitoring of the set of search space sets which is associated with the UE, the set of common search space sets, or both, wherein communicating with the UE is based at least in part on the indication of the first search space set, the second search space set, or both.

Aspect 29: The method of any of aspects 20 through 28, further comprising: receiving, as part of the UE capability, an indication of a format for DCI associated with intra-slot downlink control channel repetitions, inter-slot downlink control channel repetitions, or both; and transmitting, to the UE based at least in part on the indication of the format, an indication of a first search space set and a second search space set associated with the first search space set, wherein communicating with the UE is based at least in part on the indication of the first search space set, the second search space set, or both.

Aspect 30: The method of any of aspects 20 through 29, further comprising: receiving, as part of the UE capability, an indication that the UE supports receipt of a first downlink control channel transmission associated with a first CORESET associated with a first set of parameters, and a second downlink control channel transmission associated with the first downlink control channel transmission and associated with a second CORESET associated with a second set of parameters, wherein transmitting the configuration is based at least in part on the indication that the UE supports receipt of the first downlink control channel transmission and the second downlink control channel transmission.

Aspect 31: The method of aspect 30, wherein the first set of parameters, the second set of parameters, or both, comprise a CORESET duration, a CCE-REG mapping type, a precoding granularity, a CORESET pool index, or any combination thereof.

Aspect 32: The method of any of aspects 30 through 31, wherein the first set of parameters is different from the second set of parameters.

Aspect 33: The method of any of aspects 20 through 32, further comprising: receiving, as part of the UE capability, an indication that the UE supports monitoring of a quantity of control channel candidates per span of resources, a quantity of CCEs per span of resources, or both, wherein transmitting the configuration is based at least in part on the indication of the quantity of control channel candidates per span of resources, the quantity of CCEs per span of resources, or both.

Aspect 34: The method of any of aspects 20 through 33, wherein the UE capability indicates that the UE supports receipt of SFN downlink control channel transmissions, the method further comprising: transmitting, to the UE, an indication of a CORESET comprising two TCI states, wherein the communicating is based at least in part on the indication of the CORESET.

Aspect 35: The method of any of aspects 20 through 34, wherein the UE capability indicates that the UE supports receipt of SFN downlink control channel transmissions, the method further comprising: receiving, as part of the UE capability, an indication of a quantity of CORESETs within a BWP, wherein transmitting the configuration is based at least in part on the indication of the quantity of CORESETs within the BWP.

Aspect 36: The method of any of aspects 20 through 35, wherein communicating with the UE comprises: transmitting, to the UE, a first downlink control channel transmission and a second downlink control channel transmission associated with the first downlink control channel transmission, where the first downlink control channel transmission and the second downlink control channel transmission are transmitted based at least in part on the configuration.

Aspect 37: The method of any of aspects 20 through 36, wherein the multiple related downlink control channel transmissions are transmitted according to a 5G radio access technology, a NR access technology, or both.

Aspect 38: An apparatus for wireless communication at a UE, comprising a processor; memory coupled with the processor; and instructions stored in the memory and executable by the processor to cause the apparatus to perform a method of any of aspects 1 through 19.

Aspect 39: An apparatus for wireless communication at a UE, comprising at least one means for performing a method of any of aspects 1 through 19.

Aspect 40: A non-transitory computer-readable medium storing code for wireless communication at a UE, the code comprising instructions executable by a processor to perform a method of any of aspects 1 through 19.

Aspect 41: An apparatus for wireless communication at a base station, comprising a processor; memory coupled with the processor; and instructions stored in the memory and executable by the processor to cause the apparatus to perform a method of any of aspects 20 through 37.

Aspect 42: An apparatus for wireless communication at a base station, comprising at least one means for performing a method of any of aspects 20 through 37.

Aspect 43: A non-transitory computer-readable medium storing code for wireless communication at a base station, the code comprising instructions executable by a processor to perform a method of any of aspects 20 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
transmitting, to a base station, a UE capability to support receipt of multiple related downlink control channel transmissions, wherein the multiple related downlink control channel transmissions that are supported comprise one or more of single-frequency network downlink control channel transmissions, intra-slot downlink control channel repetitions, or inter-slot downlink control channel repetitions, and are associated with one or more control resource sets, and wherein the capability comprises an indication that the UE supports receipt of the multiple related downlink control channel transmissions within a same span of resources, within different spans of resources, or both;
receiving, from the base station based at least in part on transmission of the UE capability comprising the indication, a control message that indicates a configuration for receiving the multiple related downlink control channel transmissions; and
monitoring, based at least in part on the indication, a downlink control channel in accordance with the configuration.

2. The method of claim 1, further comprising:
transmitting, as part of the UE capability, an indication that the UE supports receipt of multiple related downlink control channel transmissions which are associated with three or more control resource sets, wherein the three or more control resource sets are associated with a common bandwidth part, wherein receiving the configuration is based at least in part on the indication that the UE supports receipt of multiple related downlink control channel transmissions which are associated with the three or more control resource sets.

3. The method of claim 1, wherein the UE capability indicates that the UE supports receipt of intra-slot downlink control channel repetitions, the method further comprising:
receiving, from the base station, an indication of a first search space set and a second search space set associated with the first search space set, wherein a first monitoring occasion of the first search space set is associated with a second monitoring occasion of the second search space set, where both the first monitoring occasion and the second monitoring occasion are located in a common slot, wherein the monitoring is based at least in part on the indication of the first search space set, the second search space set, or both.

4. The method of claim 3, further comprising:
transmitting, as part of the UE capability, an indication that the UE supports receipt of downlink control channel transmissions which are received within the first monitoring occasion of the first search space set, the second monitoring occasion of the second search space set, or both, wherein the first monitoring occasion and the second monitoring occasion at least partially overlap in a time domain, a frequency domain, or both, wherein receiving the indication of the first search space set, the second search space set, or both, is based at least in part on the indication that the UE supports receipt of downlink control channel transmissions which are received within the first monitoring occasion of the first search space set, the second monitoring occasion of the second search space set, or both.

5. The method of claim 1, further comprising:
transmitting, as part of the UE capability, an indication that the UE supports monitoring of a set of UE-specific search space sets, a set of common search space sets, or both; and
receiving, from the base station, an indication of a first search space set and a second search space set associated with the first search space set based at least in part on the indication that the UE supports the monitoring of the set of UE-specific search space sets which is associated with the UE, the set of common search space sets, or both, wherein the monitoring is based at least in part on the indication of the first search space set, the second search space set, or both.

6. The method of claim 1, further comprising:
transmitting, as part of the UE capability, an indication that the UE supports monitoring of a quantity of control channel candidates per span of resources, a quantity of control channel elements per span of resources, or both, wherein receiving the configuration is based at least in part on the indication of the quantity of control channel candidates per span of resources, the quantity of control channel elements per span of resources, or both.

7. The method of claim 1, wherein the UE capability indicates that the UE supports receipt of single-frequency network downlink control channel transmissions, the method further comprising:
receiving, from the base station, an indication of a control resource set comprising two transmission configuration indicator states, wherein the monitoring is based at least in part on the indication of the control resource set.

8. The method of claim 1, wherein the UE capability indicates that the UE supports receipt of inter-slot downlink control channel repetitions, the method further comprising:
receiving, from the base station, an indication of a first search space set and a second search space set associated with the first search space set, where a first monitoring occasion of the first search space set in a first slot is associated with a second monitoring occasion of the second search space set in a second slot different from the first slot, wherein the monitoring is based at least in part on the indication of the first search space set, the second search space set, or both.

9. The method of claim 8, further comprising:
transmitting, as part of the UE capability, an indication of a quantity of slots between a first downlink control channel transmission and a second downlink control channel transmission associated with the first downlink control channel transmission that are capable of being decoded by the UE, wherein receiving the indication of the first search space set, the second search space set, or both, is based at least in part on the quantity of slots.

10. The method of claim 1, further comprising:
transmitting, as part of the UE capability, an indication of a maximum number of slots across which the UE supports one or more linked search space sets for inter-slot downlink control channel repetitions in accordance with a search space set periodicity for the one or more linked search space sets.

11. The method of claim 1, further comprising:
transmitting, as part of the UE capability, an indication of a quantity of downlink control channel monitoring occasions within one or more slots which are monitored by the UE; and
receiving, from the base station based at least in part on the indication of the quantity of downlink control channel monitoring occasions, an indication of a first search space set and a second search space set associated with the first search space set, wherein the monitoring is based at least in part on the indication of the first search space set, the second search space set, or both.

12. The method of claim 1, further comprising:
transmitting, as part of the UE capability, an indication of a format for downlink control information associated with intra-slot downlink control channel repetitions, inter-slot downlink control channel repetitions, or both; and
receiving, from the base station based at least in part on the indication of the format, an indication of a first search space set and a second search space set associated with the first search space set, wherein the monitoring is based at least in part on the indication of the first search space set, the second search space set, or both.

13. The method of claim 1, further comprising:
transmitting, as part of the UE capability, an indication that the UE supports receipt of a first downlink control channel transmission associated with a first control resource set associated with a first set of parameters, and a second downlink control channel transmission associated with the first downlink control channel transmission and associated with a second control resource set associated with a second set of parameters, wherein receiving the configuration is based at least in part on the indication that the UE supports receipt of the first downlink control channel transmission and the second downlink control channel transmission.

14. The method of claim 13, wherein the first set of parameters, the second set of parameters, or both, comprise a control resource set duration, a control channel element-resource element group mapping type, a precoding granularity, a control resource set pool index, or any combination thereof.

15. The method of claim 13, wherein the first set of parameters is different from the second set of parameters.

16. The method of claim 1, wherein the UE capability indicates that the UE supports receipt of single-frequency network downlink control channel transmissions, the method further comprising:
transmitting, as part of the UE capability, an indication of a quantity of control resource sets within a bandwidth part, wherein receiving the configuration is based at least in part on the indication of the quantity of control resource sets within the bandwidth part.

17. The method of claim 1, further comprising:
receiving, from the base station based at least in part on the monitoring, a first downlink control channel transmission and a second downlink control channel transmission associated with the first downlink control channel transmission, where the first downlink control channel transmission and the second downlink control channel transmission are transmitted based at least in part on the configuration.

18. The method of claim 1, wherein the multiple related downlink control channel transmissions are transmitted according to a fifth generation radio access technology, a New Radio access technology, or both.

19. A method for wireless communication at a base station, comprising:
receiving, from a user equipment (UE), a UE capability of the UE to support receipt of multiple related downlink control channel transmissions, wherein the multiple related downlink control channel transmissions that are supported comprise one or more of single-frequency network downlink control channel transmissions, intra-slot downlink control channel repetitions, or inter-slot downlink control channel repetitions, and are associated with one or more control resource sets, and wherein the capability comprises an indication that the UE supports receipt of the multiple related downlink control channel transmissions within a same span of resources, within different spans of resources, or both;
transmitting, to the UE based at least in part on reception of the UE capability comprising the indication, a control message that indicates a configuration for transmitting the multiple related downlink control channel transmissions; and
communicating with the UE via a downlink control channel in accordance with the configuration.

20. The method of claim 19, further comprising:
receiving, as part of the UE capability, an indication that the UE supports receipt of multiple related downlink control channel transmissions which are associated with three or more control resource sets, wherein the three or more control resource sets are associated with a common bandwidth part, wherein transmitting the configuration is based at least in part on the indication that the UE supports receipt of multiple related downlink control channel transmissions which are associated with the three or more control resource sets.

21. The method of claim 19, wherein the UE capability indicates that the UE supports receipt of intra-slot downlink control channel repetitions, the method further comprising:
transmitting, to the UE, an indication of a first search space set and a second search space set associated with the first search space set, wherein a first monitoring occasion of the first search space set is associated with a second monitoring occasion of the second search space set, where both the first monitoring occasion and the second monitoring occasion are located in a common slot, wherein the communicating is based at least in part on the indication of the first search space set, the second search space set, or both.

22. The method of claim 21, further comprising:
receiving, as part of the UE capability, an indication that the UE supports receipt of downlink control channel transmissions which are received within the first monitoring occasion of the first search space set, the second monitoring occasion of the second search space set, or both, wherein the first monitoring occasion and the second monitoring occasion at least partially overlap in a time domain, a frequency domain, or
both, wherein transmitting the indication of the first search space set, the second search space set, or both, is based at least in part on the indication that the UE supports receipt of downlink control channel transmissions which are received within the first monitoring occasion of the first search space set, the second monitoring occasion of the second search space set, or both.

23. The method of claim 19, further comprising:
receiving, as part of the UE capability, an indication that the UE supports monitoring of a set of UE-specific search space sets, a set of common search space sets, or both; and
transmitting, to the UE, an indication of a first search space set and a second search space set associated with the first search space set based at least in part on the indication that the UE supports the monitoring of the set of UE-specific search space sets which is associated with the UE, the set of common search space sets, or both, wherein communicating with the UE is based at least in part on the indication of the first search space set, the second search space set, or both.

24. The method of claim 19, wherein the UE capability indicates that the UE supports receipt of inter-slot downlink control channel repetitions, the method further comprising:
transmitting, to the UE, an indication of a first search space set and a second search space set associated with the first search space set, where a first monitoring occasion of the first search space set in a first slot is associated with a second monitoring occasion of the second search space set in a second slot different from the first slot, wherein the communicating is based at least in part on the indication of the first search space set, the second search space set, or both.

25. The method of claim 24, further comprising:
receiving, as part of the UE capability, an indication of a quantity of slots between a first downlink control channel transmission and a second downlink control channel transmission associated with the first downlink control channel transmission that are capable of being decoded by the UE, wherein transmitting the indication of the first search space set, the second search space set, or both, is based at least in part on the quantity of slots.

26. The method of claim 19, further comprising:
receiving, as part of the UE capability, an indication of a maximum number of slots across which the UE supports one or more linked search space sets for inter-slot downlink control channel repetitions in accordance with a search space set periodicity for the one or more linked search space sets.

27. The method of claim 19, further comprising:
receiving, as part of the UE capability, an indication of a quantity of downlink control channel monitoring occasions within one or more slots which are monitored by the UE; and transmitting, to the UE based at least in part on the indication of the quantity of downlink control channel monitoring occasions, an indication of a first search space set and a second search space set associated with the first search space set, wherein communicating with the UE is based at least in part on the indication of the first search space set, the second search space set, or both.

28. An apparatus for wireless communication at a user equipment (UE), comprising:
at least one processor; and
memory coupled to the at least one processor, the memory storing instructions executable by the at least one processor to cause the apparatus to:
transmit, to a base station, a UE capability to support receipt of multiple related downlink control channel transmissions, wherein the multiple related downlink control channel transmissions that are supported comprise one or more of single-frequency network downlink control channel transmissions, intra-slot downlink control channel repetitions, or inter-slot downlink control channel repetitions, and are associated with one or more control resource sets, wherein the capability comprises an indication that the UE supports receipt of the multiple related downlink control channel transmissions within a same span of resources, within different spans of resources, or both;
receive, from the base station based at least in part on transmission of the UE capability comprising the indication, a control message that indicates a configuration for receiving the multiple related downlink control channel transmissions; and
monitor, based at least in part on the indication, a downlink control channel in accordance with the configuration.

29. An apparatus for wireless communication at a base station, comprising:
at least one processor; and
memory coupled to the at least one processor, the memory storing instructions executable by the at least one processor to cause the apparatus to:
receive, from a user equipment (UE), a UE capability of the UE to support receipt of multiple related downlink control channel transmissions, wherein the multiple related downlink control channel transmissions that are supported comprise one or more of single-frequency network downlink control channel transmissions, intra-slot downlink control channel repetitions, or inter-slot downlink control channel repetitions, and are associated with one or more control resource sets, and wherein the capability comprises an indication that the UE supports receipt of the multiple related downlink control channel transmissions within a same span of resources, within different spans of resources, or both;
transmit, to the UE based at least in part on reception of the UE capability comprising the indication, a control message that indicates a configuration for transmitting the multiple related downlink control channel transmissions; and
communicate with the UE via a downlink control channel in accordance with the configuration.

* * * * *